US010612830B2

(12) United States Patent
de Cavalcanti et al.

(10) Patent No.: US 10,612,830 B2
(45) **Date of Patent: *Apr. 7, 2020**

(54) APPARATUS, METHOD, AND SYSTEM FOR FILTERING AIR TO AND FROM A REFRIGERATED COMPARTMENT OF A REFRIGERATION APPLIANCE

(71) Applicant: WHIRLPOOL CORPORATION, Benton Harbor, MI (US)

(72) Inventors: Daniel de Cavalcanti, St. Joseph, MI (US); Alexandre D. Grosse, Joionville-SE (BR); Douglas Pohl, Davenport, IA (US); Jose Paulo Remor, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/158,686

(22) Filed: Oct. 12, 2018

(65) Prior Publication Data

US 2019/0041117 A1 Feb. 7, 2019

Related U.S. Application Data

(63) Continuation of application No. 15/160,271, filed on May 20, 2016, now Pat. No. 10,139,150.

(51) Int. Cl.
*B01D 46/44* (2006.01)
*F25D 17/06* (2006.01)
(Continued)

(52) U.S. Cl.
CPC ......... *F25D 17/042* (2013.01); *F25D 23/066* (2013.01); *F25D 27/00* (2013.01);
(Continued)

(58) Field of Classification Search
CPC ......... B01D 46/44; B01D 50/00; F25D 17/06; F25D 17/04; F25D 23/06; F25D 27/00;
(Continued)

(56) References Cited

U.S. PATENT DOCUMENTS

| | | | |
|---|---|---|---|
| 6,979,361 | B2 | 12/2005 | Mihayiov et al. |
| 7,600,388 | B2 | 10/2009 | Vestal |

(Continued)

FOREIGN PATENT DOCUMENTS

| | | | |
|---|---|---|---|
| CN | 2162612 | Y | 4/1994 |
| CN | 2401534 | Y | 10/2000 |

(Continued)

*Primary Examiner* — Minh Chau T Pham
(74) *Attorney, Agent, or Firm* — Price Heneveld LLP

(57) ABSTRACT

A refrigerator includes a liner having an opening defining an inner perimeter therein, a frame coupled with the liner around the inner perimeter and recessed from the opening, and a cover. The cover is coupled with the frame and has a major surface positioned generally flush with a portion the liner surrounding the opening. The cover defines an outer perimeter spaced apart from the inner perimeter of the opening with a portion of the frame at least partially enclosing a channel extending between the outer perimeter of the cover and the inner perimeter of the opening. The assembly further includes at least one light source directed into the channel and illuminating a portion of the frame and an air filter disposed at least partially within the cover positioned behind the major surface.

20 Claims, 19 Drawing Sheets

(51) Int. Cl.

| | |
|---|---|
| ***F25D 17/04*** | (2006.01) |
| ***F25D 23/06*** | (2006.01) |
| ***F25D 27/00*** | (2006.01) |
| ***F25B 39/04*** | (2006.01) |
| ***F21V 33/00*** | (2006.01) |
| ***F21W 131/305*** | (2006.01) |
| ***F21Y 105/10*** | (2016.01) |

(52) U.S. Cl.
CPC .... *F21V 33/0044* (2013.01); *F21W 2131/305* (2013.01); *F21Y 2105/10* (2016.08); *F25D 2317/041* (2013.01); *F25D 2700/02* (2013.01)

(58) Field of Classification Search
CPC .. F25D 17/042; F25D 23/066; F25D 2700/02; F25D 2317/041; F25B 39/04; F21V 33/00; F21V 33/0044; F21W 131/305; F21W 2131/305; F21Y 105/10; F21Y 2105/10
USPC ........ 55/385.1, 395.2, DIG. 34; 96/414–417, 96/421, 422; 62/89, 183, 126, 317, 331, 62/419, 507
See application file for complete search history.

(56) References Cited

U.S. PATENT DOCUMENTS

| | | | |
|---|---|---|---|
| D616,001 | S | 5/2010 | Yang et al. |
| 8,002,367 | B2 | 8/2011 | Kim et al. |
| D654,515 | S | 2/2012 | Hwang et al. |
| D657,402 | S | 4/2012 | Hwang et al. |
| D710,402 | S | 8/2014 | Jeon et al. |
| 9,599,394 | B2 * | 3/2017 | Kobos ..................... F25D 23/10 |
| 10,139,150 | B2 * | 11/2018 | de Cavalcanti ....... F25D 17/042 |
| 2009/0278448 | A1 | 11/2009 | Tchakarov |
| 2009/0303695 | A1 | 12/2009 | Buchstab et al. |
| 2010/0199706 | A1 | 8/2010 | Bischofberger et al. |
| 2010/0320890 | A1 | 12/2010 | Jung et al. |
| 2012/0017629 | A1 | 1/2012 | Shin |
| 2012/0180667 | A1 | 7/2012 | Otesen et al. |
| 2013/0014646 | A1 | 1/2013 | Rojas et al. |
| 2018/0017317 | A1 | 1/2018 | Adachi et al. |

FOREIGN PATENT DOCUMENTS

| | | | |
|---|---|---|---|
| CN | 201754008 | U | 3/2011 |
| CN | 202470609 | U | 10/2012 |
| EP | 1645823 | A2 | 8/2005 |
| JP | 9079729 | A | 3/1997 |
| KR | 100821748 | B1 | 4/2008 |
| KR | 1020090075054 | A | 7/2009 |

* cited by examiner

APPARATUS, METHOD, AND SYSTEM FOR FILTERING AIR TO AND FROM A REFRIGERATED COMPARTMENT OF A REFRIGERATION APPLIANCE

CROSS-REFERENCE TO RELATED APPLICATION

This application is a continuation of U.S. patent application Ser. No. 15/160,271, filed on May 20, 2016, now U.S. Pat. No. 10,139,150 B2, entitled "APPARATUS, METHOD, AND SYSTEM FOR FILTERING AIR TO AND FROM A REFRIGERATED COMPARTMENT OF A REFRIGERATION APPLIANCE", the entire disclosure of which is hereby incorporated by reference.

FIELD OF THE INVENTION

The present invention relates to refrigeration appliances such as refrigerators, refrigerators/freezers, freezers, and the like, and in particular, refrigerated appliances having air filters for filtering air circulated through at least one interior compartment of the appliance.

BACKGROUND

Filtering air to and from a refrigerated compartment is known. One example of a replaceable or refreshable air filter is the FreshFlow™ brand air filter available from Whirlpool® Corporation under part number W10311524. Benefits of filtered air include, but are not limited to, neutralizing odors and bacteria.

Designing such filtering must balance a variety of issues and factors. Examples are functionality, maintenance or repair, space utilization, power usage, and economy in terms of cost of materials, production of components, and assembly. Another is acceptable co-existence and integration aesthetically and with the other refrigerator functions.

As is appreciated by those in this technical field, some of the above factors are antagonistic. Therefore, it has been identified there is room for improvement in this technical area.

SUMMARY

The present disclosure presents an apparatus, method, or system for filtering air to and from a refrigerated compartment of a refrigeration appliance that improves over or solves problems and deficiencies in the art.

Additionally, a device, method, or system as described integrates functionally and aesthetically into a refrigerated appliance, helps the consumer identify and locate a replaceable air filter, integrates multiple functions including identification and location of the filter and air intake to the filter, economically provides for such multiple functionalities in terms of material, production, assembly, operational, and maintenance costs and economically and efficiently integrates into a refrigerated appliance both regarding space utilization and resource utilization (e.g., electrical power).

According to one aspect of the present disclosure, a refrigerator includes a cabinet body, an interior liner in the cabinet body defining at least a portion of an interior space, and an air filter assembly positioned in the interior liner. The air filter assembly includes a surface facing the interior space and generally flush with the liner, a luminous frame around the surface, an air filter covered by and recessed from the surface, and an air path from the interior space through the filter.

According to another aspect of the present disclosure, a refrigerator includes a cabinet body having interior and exterior wall surfaces, and at least one door openable and closeable over an opening into the cabinet body. An air filter assembly is housed within the cabinet body and has one or more air intake ports, an air filter cover in the interior wall surface in covering relation over the air filter assembly, and an illuminated frame member surrounding the air filter cover. The illuminated frame member comprises at least a portion of the one or more air intake ports surrounding the air filter cover.

According to another aspect of the present disclosure, a method of operating a refrigerator having an outer cabinet and an inner liner defining an interior refrigerated or freezer compartment enclosable by at least one door includes exchanging air to and from the compartment through an air filter positioned between the cabinet and the liner behind a removable cover generally flush with the liner and having a perimeter accenting the perimeter of the cover with lighting.

According to another aspect, a refrigerator includes a liner having an opening defining an inner perimeter therein, a frame coupled with the liner around the inner perimeter and recessed from the opening, and a cover. The cover is coupled with the frame and has a major surface positioned generally flush with a portion the liner surrounding the opening. The cover defines an outer perimeter spaced apart from the inner perimeter of the opening with a portion of the frame at least partially enclosing a channel extending between the outer perimeter of the cover and the inner perimeter of the opening. The assembly further includes at least one light source directed into the channel and illuminating a portion of the frame and an air filter disposed at least partially within the cover positioned behind the major surface.

According to another aspect a refrigerator includes a cabinet body, an interior liner disposed in the cabinet body and defining at least a portion of an interior space within the refrigerator, the interior liner defining an opening therein, the opening defining an inner perimeter, and an air filter assembly positioned at least partially in the opening of the interior liner. The air filter assembly includes a cover having a major surface facing the interior space and positioned generally flush with a portion the liner surrounding the opening, the cover defining an outer perimeter spaced apart from the inner perimeter of the opening. The air filter assembly further includes a frame recessed from the surface and the liner and at least partially enclosing a channel extending between the outer perimeter of the cover and the inner perimeter of the opening. At least one light source is directed into the channel and illuminates a portion of the frame, and an air filter is disposed at least partially within the cover positioned behind the major surface.

According to another aspect a refrigerator air filter assembly includes a cover having a major surface defining an outer perimeter and a frame. The frame includes an outer portion defining an inner perimeter spaced from the outer perimeter of the major surface, an inner portion extending behind the surface, and an intermediate portion that extends from the inner portion, beyond the outer perimeter of the major surface and to the outer portion. The intermediate portion is recessed from the surface and at least partially encloses a channel extending between the outer perimeter of the major surface and the inner perimeter of the outer portion. The assembly further includes at least one light source directed into the channel and illuminating a portion of the frame and an air filter disposed between the cover and the inner portion of the frame.

These and other features, advantages, and objects of the present device will be further understood and appreciated by those skilled in the art upon studying the following specification, claims, and appended drawings.

DETAILED DESCRIPTION OF EMBODIMENTS

Figure 1A:
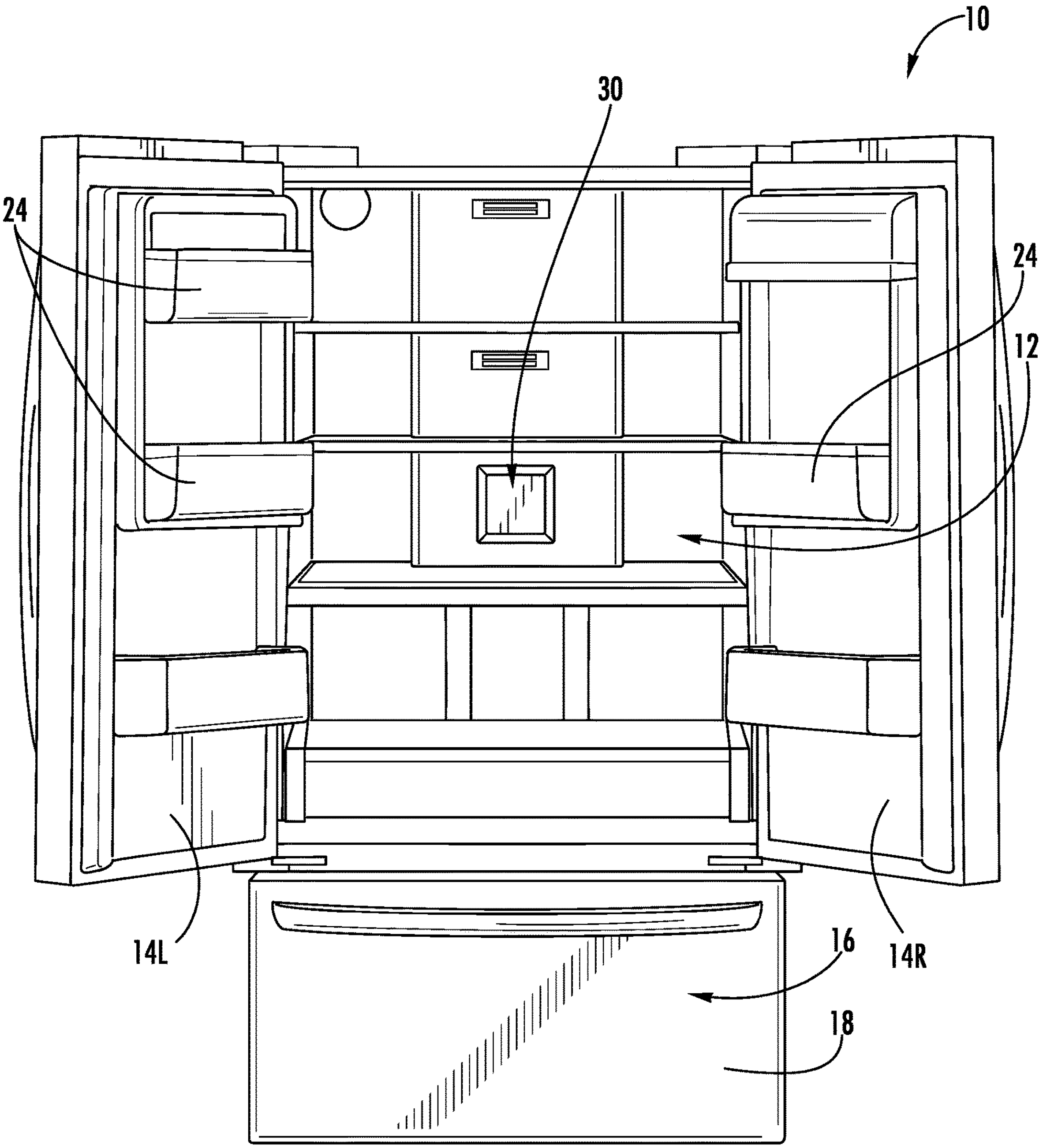
FIG. 1A is a perspective view of a refrigerated appliance according to a general exemplary embodiment of the invention with doors opened to a fresh food compartment and showing an air filter assembly according to an exemplary embodiment of the present invention on the back wall of the fresh food compartment.
Figure 1B:
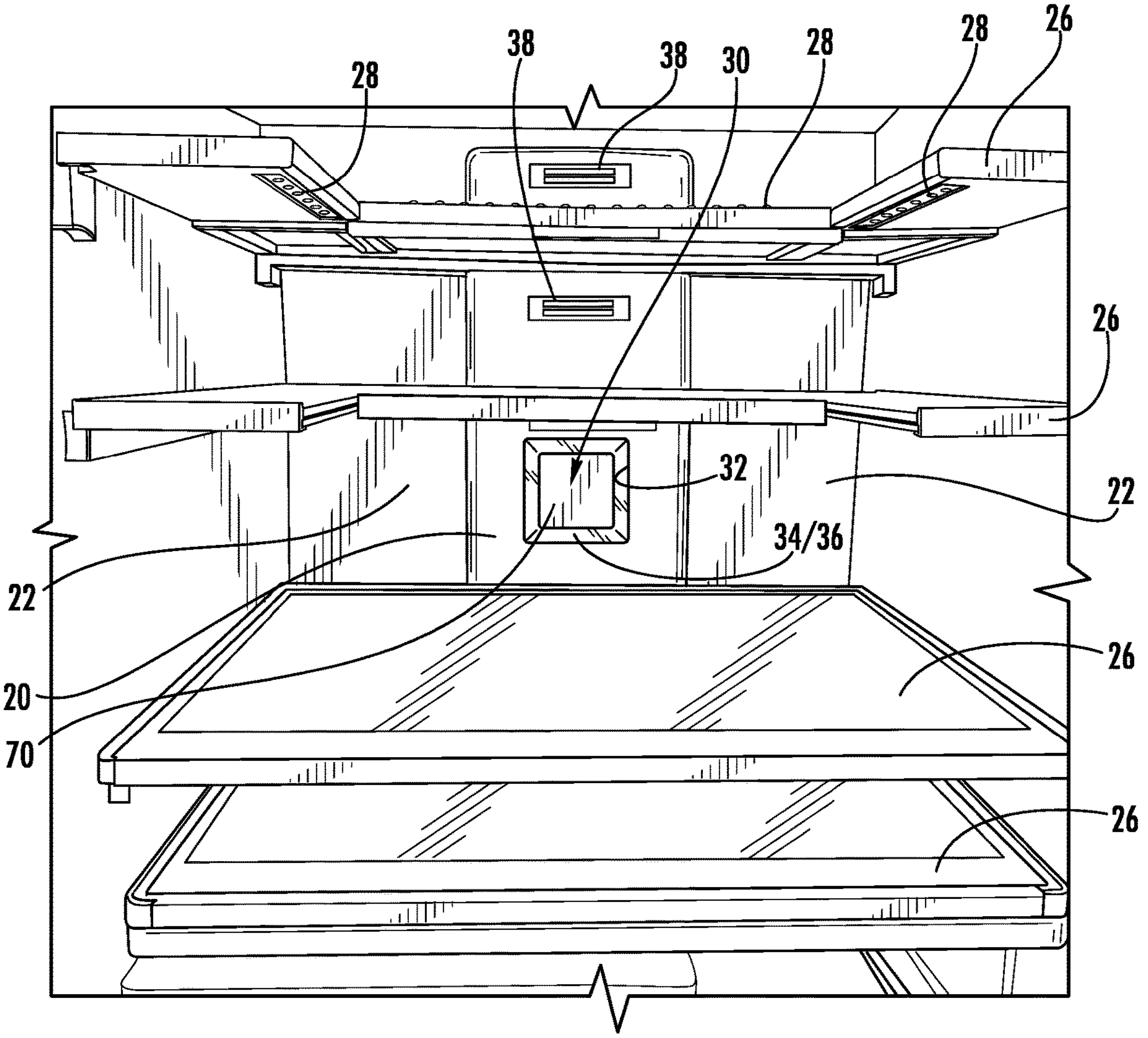
FIG. 1B is a an enlarged view of the air filter assembly and fresh food compartment of FIG. 1A.
Figure 1C:
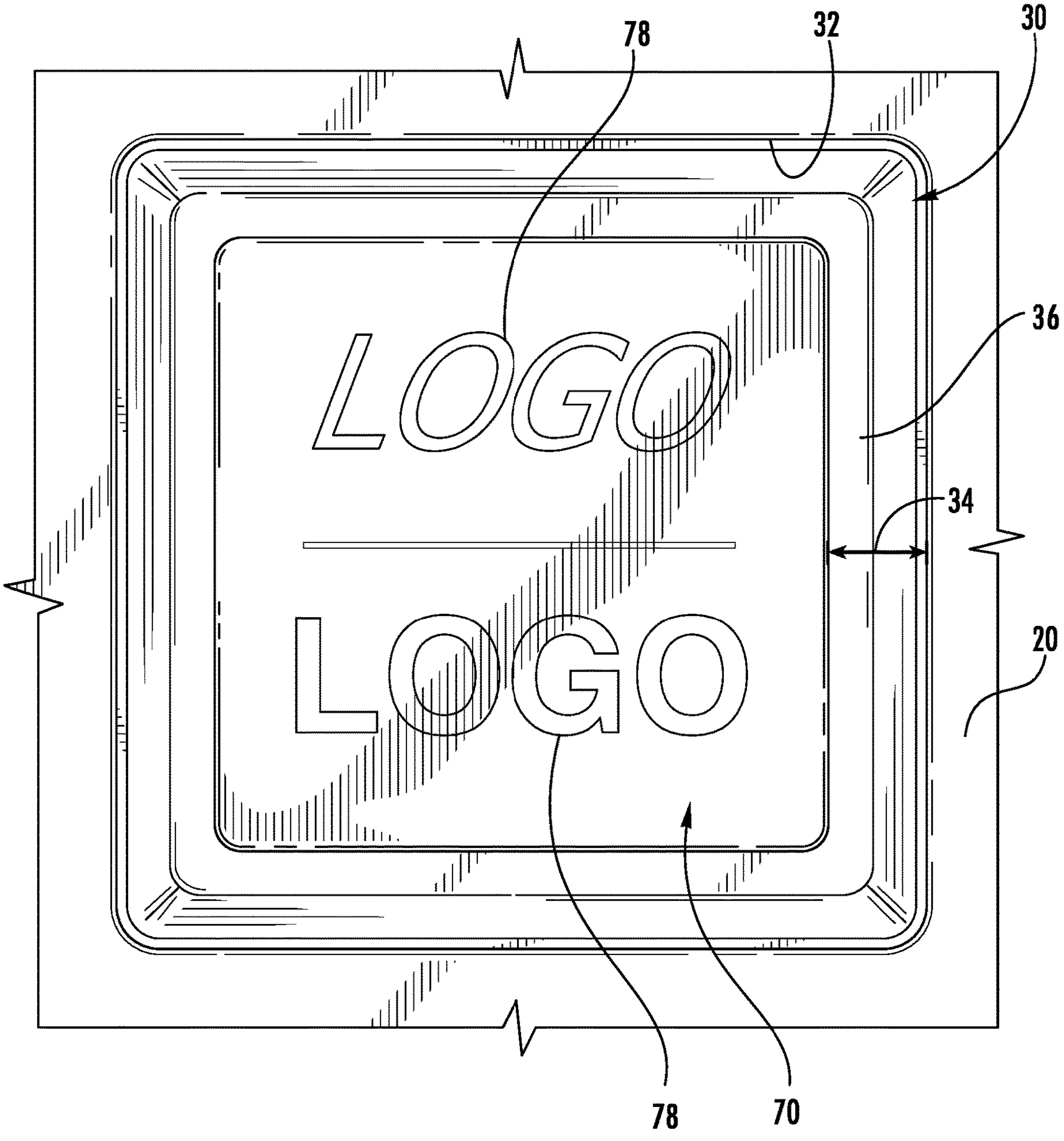
FIG. 1C is a still further enlarged close-up view of the air filter assembly of FIGS. 1A and 1B.

For a better understanding of the invention, examples of several forms the invention can take will now be set forth in detail. These examples are neither inclusive nor exclusive of the forms and variations possible with the invention.

The exemplary embodiments will be discussed primarily in the context of a French-door-type household refrigerator (fresh food compartment accessible by two oppositely openable and closeable doors with bottom freezer below it). The rear wall of the refrigerator fresh food compartment has what will be called an air tower, which is an air flow channel or space vertically behind or otherwise integrated with that liner wall. The refrigerator has conventional control circuitry and components for conventional refrigerator/freezer functions such as refrigerated and circulated air, interior space illumination, and other operations. For example, the control circuitry supplies electrical power for lighting to illuminate the fresh food compartment when it senses at least one door to it is opened, accordingly turning the lighting on and off with respective opening and closing of the doors 14. The control circuit can also operate such things as a fan to control air flow in the appliance.

It is to be understood, however, that the invention is applicable to other configurations of refrigeration appliances. It can be applied to almost any type of refrigeration appliance in analogous ways to the embodiments discussed below.

FIGS. 1A-D illustrate an air filter assembly (generally referred to by reference numeral 30) according to an exemplary embodiment of the invention. As illustrated, a French door refrigerator appliance (generally reference numeral 10) includes a fresh food compartment 12 accessible through French doors 14L and 14R. A bottom freezer drawer 16 has a drawer cover 18.

As is conventional, refrigerator 10 has an inner plastic liner. Insulation can be injected between the liner and the exterior cabinet wall so there is generally a space behind the liner not only for insulation but also wiring, conduits or channels for air flow, or placement of other structures or components between the liner and the exterior cabinet.

A portion of rear liner wall 22 of fresh food compartment 12, in this embodiment, is sometimes called air tower 20. It is a vertical liner surface raised forwardly from the rest of the rear liner wall 22. This provides a larger horizontal cross-sectional space between the liner wall and the exterior cabinet. Air filter assembly 30 is mounted along this air tower, takes in air from food compartment 12 and delivers filtered air to the air tower. Filtered air is directed through the air tower to one or more return air vents 38 spaced apart from air filter assembly 30 along air tower 20.

As will be explained in more detail, air filter assembly 30 includes an air intake. Air filtering occurs by drawing air into that intake of air filter assembly 30, up through air tower 20, and back out into fresh food compartment 12 through air return vents 38. As indicated at FIGS. 1A and B, one or more bins (e.g., bins 24 in FIG. 1A), shelves (e.g., shelves 26 in FIG. 1B), brackets, other drawers, or surfaces can be arranged in fresh food compartment 12 on or in which can be supported various food items to be refrigerated.

Figure 1D:
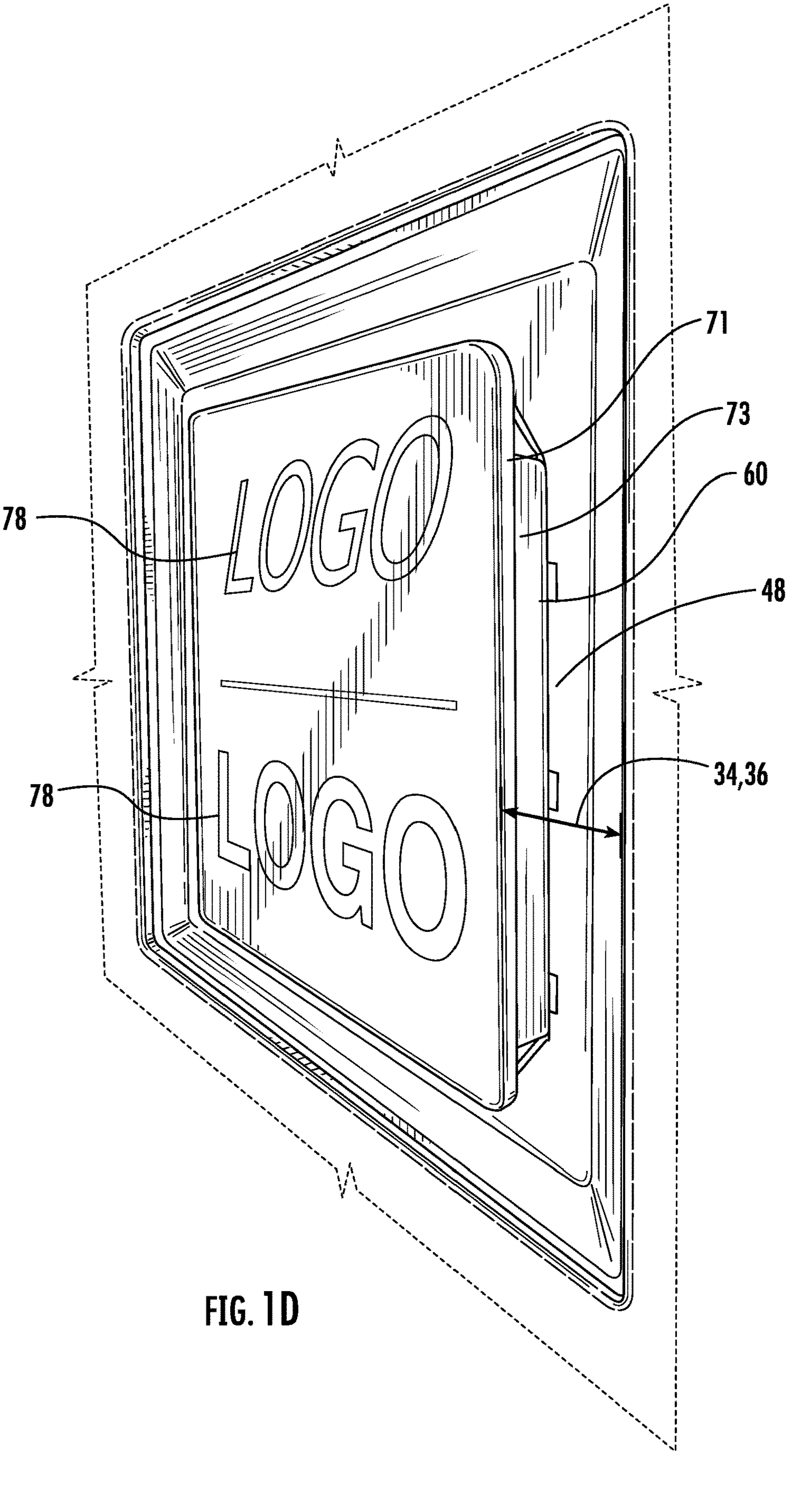
FIG. 1D is a close-up view of the air filter assembly of FIG. 1C from a different perspective showing an air filter cover basically flush or in-plane with the rear wall surface in which it is located and a channel surrounding it that serves both to provide accent lighting for the location of the filter and an air intake for the filter.

Air filter assembly 30 has the following features. A pre-formed opening 32 in air tower 20 surrounds and essentially "frames" a removable filter cover 70. The gap between liner opening 32 and the perimeter of cover 70 will sometimes be called channel 34. As indicated at FIG. 1D, the forward surface 71 of cover 70 is at least approximately flush or coplanar with the portion of the liner wall that defines the visible portion of air tower 20. Supported by structure behind it, which is recessed relative to the outer surface of air tower 20, cover 70 is suspended within opening 32 such that it appears to be "floating."

Light sources in air filter assembly 30 are configured to provide what might be considered accent lighting for air filter cover 70. As will be explained later, light sources recessed from the plane of cover 70 and air tower 20 are used to create luminosity in or at channel 34. This luminous channel surrounds or frames cover 70 of an air filter held behind it. This allows an aesthetically-pleasing accent lighting of the location of the air filter. It additionally helps a consumer know where the air filter is and how to locate it (e.g. for replacement or recharging).

As further indicated in FIGS. 1A-D, other lighting typically exists in refrigerator 10. For example, independent illumination of fresh food compartment 12 is accomplished through one or more other light sources 28 (see FIG. 1B, which illustrates a few). They can be of any of a variety of configurations including LED lighting. In this example, they are white LEDs providing daylight-type illumination of spaces in fresh food compartment 12.

The accent lighting in channel 34 from air filter assembly 30 can be a different color (e.g., blue) to provide contrast and bring attention to filter assembly 30 relative to other lighting in refrigerator 10. Air filter assembly 30 is configured such that accent lighting of channel 34 does not overwhelm or materially conflict with the white illumination lighting 28 or other ambient lighting within compartment 12. For example, it generally creates an a luminous glow and neither creates significant glare to direct viewing by the consumer nor does it spill light out into the fresh food compartment 12 in a manner that materially conflicts with or is at cross-purposes with illumination lighting 28. In this embodiment the blue light is characterized by its dominant wavelength directly related with the light source used, which in the present example may be 468 nm. The width of channel is on the order of one (1) inch wide.

FIGS. 7A-D are color photographs of a form of the generalized embodiment of FIGS. 1A-D. The radiation pattern can be appreciated from these photographs, as can how it co-exists with the general illumination of the fresh food compartment of the refrigerator.

As indicated in FIGS. 1A-D, filter cover 70 can optionally include indicia 78 (words, logos, symbols, instructions, and the like) that can inform the consumer about air filter assembly 30 and its air filter. But the accent lighting in channel 34 can alone help the consumer identify and locate the air filter.

As can be further understood from FIGS. 1A-D, as well as other figures, placing the air filter behind cover 70 (which, in the present example, is flush with the outside surface of air tower 20) does not materially interfere with the fresh food compartment 12 space. In other words, air filter assembly 30 does not extend out and occupy a substantial amount of space that is otherwise useable for food storage. Cover 70 does not extend substantially forwardly of air tower 20. The rest of air filter assembly 30 is recessed behind the outer wall of air tower 20.

As will be further discussed below, the accent lighting produced by this embodiment is essentially a glow more in the nature of backlighting than of task lighting. LED light sources with blue color output cooperate with light transmissive surfaces to produce the glow or luminance. Such characteristics and effects may be achieved by selecting LEDs of certain characteristics (e.g. light output distribution pattern, intensity, color, etc.) and light transmissive surfaces (e.g. clear, translucent, reflective, refractive, etc.) that cooperate to directly and/or indirectly produce a light intensity at and around channel 34 which distinguish from the background or other illumination, but yet do not overwhelm, inhibit, or materially affect other lighting in fresh food compartment 12. Reference numeral 36 will sometimes be used to refer to the radiation pattern or luminance at channel 34.

Air filter assembly 30 has multi-functionality including placement of a replaceable air filter for relatively easy access by the consumer, accent lighting of the removable filter cover 70 for identification and location of the air filter, and aesthetically pleasing proportionality of channel 34 with a radiation output relative to the rest of the refrigerator and cover 70, while concurrently taking advantage of space behind the outer wall of air tower 20 to build in an air intake to the air filter and communicate it to return vents 38 spaced apart from air filter assembly 30.

This combination of multi-functionality and design draws attention to and distinguishes the air filter location from other components of the refrigerator 10. In this example, the color is blue. Of course, other colors are possible, including white. It helps the consumer understand what is needed to access and replace the air filter. Replacement is periodic and recommended for optimal air filtering. Alternatively, some are refreshable or rechargeable after which they can be reinstalled.

Additionally, specific structural cooperation in air filter assembly 30 creates an output radiation pattern for the accent lighting that does not overwhelm the interior lighting 28, and does not interfere with interior lighting 28 or other lighting. It does not create problematic glare or spill light but rather is in the nature of accent lighting.

The width of channel 34 in proportion to refrigerator 10, fresh food compartment 12, and cover 70 is aesthetically pleasing. It basically distinctively "frames" cover 70. The flush position of cover 70 relative to the remaining portions of air tower 20 stands out with respect to the recess of channel 34 and gives the aesthetic appearance of cover 70 "floating" in space. The glowing or luminosity at channel 34 adds another aesthetic effect. The degree of these aesthetic effects can be adjusted or tuned by providing a desired luminosity for the accenting and visually identifying the position of assembly 30 to the consumer at or even more than several feet away (e.g. across a room) from the open doors 14L and R. On the other hand, channel width, depth, and shape, as well as proportion, creates a sufficient air intake from the fresh food compartment for purposes of effective air filtering throughput to and through the air filter and circulation back from the air filter to compartment 12. The intake area and volume of framing channel 34 relative to cover 70 and the air filter, and the air path to return vents 38, can be designed for a rate of air circulation (with or without fan operation over and above normal air exchange to and from compartment 12) which is effective for good air filtering for a refrigerator. Again, the relatively flush position of cover 70 relative to the outer surface of air tower 20, and the luminosity of the radiation pattern from channel 34 give the appearance of cover 70 "floating" in space and framed by light. But this combination also allows filter air intake essentially through the lighted channel 34.

As can be appreciated by one skilled in the art, this general relationship can be implemented in different form factors. Cover 70 can be a variety of shapes and lengths and widths. Channel 34 can vary in width and depth.

Figure 4A:
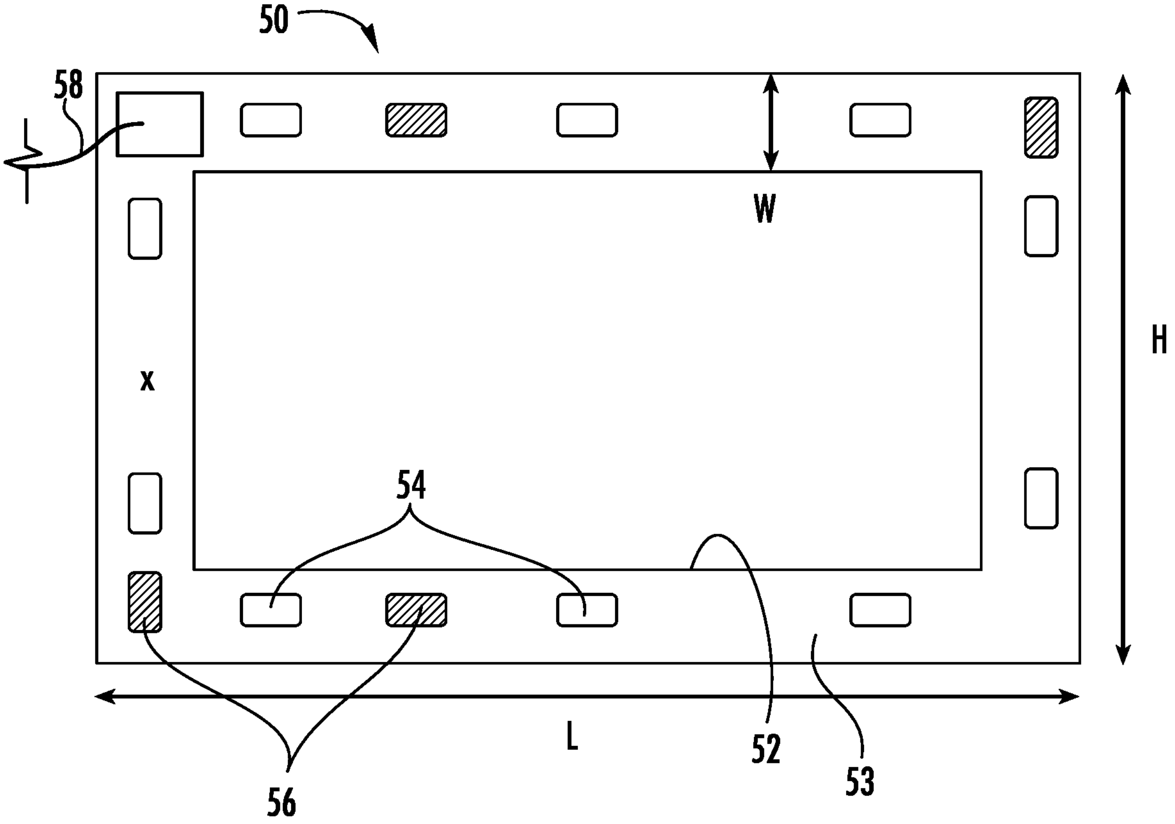
FIG. 4A is a top plan view of the printed circuit board with LED light sources that could be used in the embodiments of FIGS. 2A-D or 3A-E.
Figure 4B:
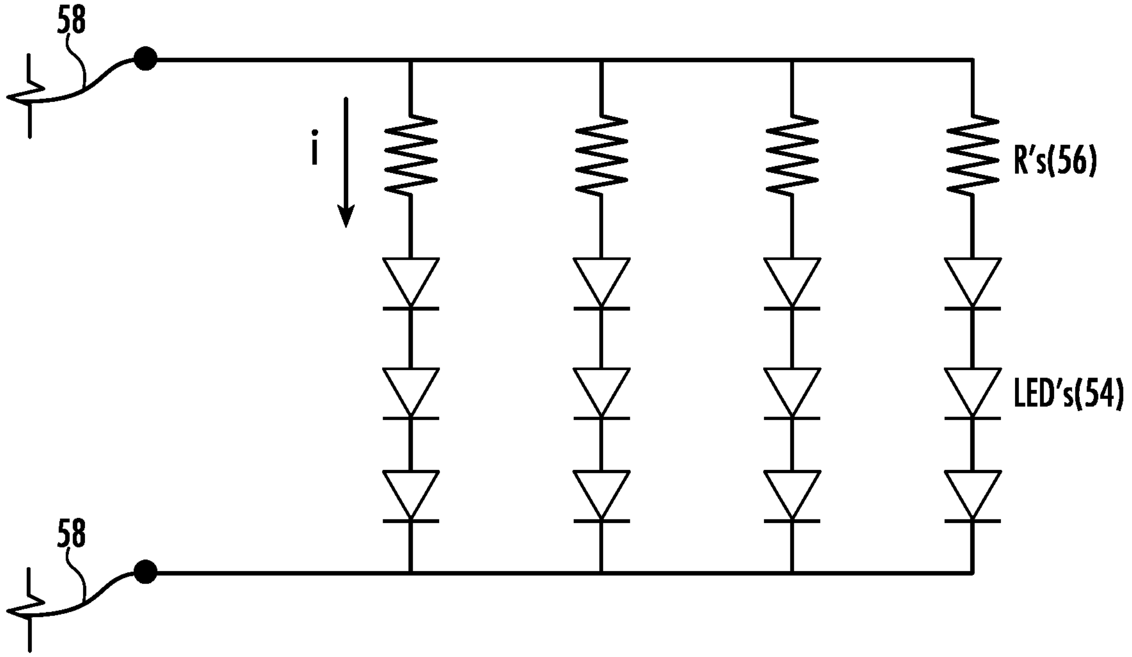
FIG. 4B is an electrical schematic of the circuitry on the printed circuit board of FIG. 4A.

FIGS. 2A-D, as well as FIGS. 4A-B, illustrate one form air filter assembly 30 can take. It includes a base 40 in the form of a reflective member comprising with reflective surface 48 (which may be achieved by a coating or the like applied over desired portions of base 40) over at least a portion thereof and clipped or snapped to air tower 20 with clips 43 over opening 32 in air tower 20. A printed circuit board 50 carrying twelve LEDs 54 mounts to the back side of reflector member 40. The LEDs match and extend through apertures 49 in base 40. A filter 60 (e.g. commercially available part number W10315189 from Whirlpool® Corporation) matingly and removably fits into receiver 47 of member 40. An insulation layer 75 may be present beneath cover 70, such as by being adhered or otherwise affixed to cover on the side opposite surface 71. Insulation layer 75 may be of foam or another insulating material to prevent help maintain a temperature of cover 70 such that condensation buildup on surface 71 is reduced or prevented.

An inner reflector member 80 has a plate 81 with distal edges 87, angled perimeter side walls 86 (all four sides), corner air openings 89 (all four corners), and a central opening 82 bounded by a pair of C-shaped walls 83. Apertures 85 in the C-shaped walls 83 snap into bosses 47 on the outside of receiver 45 of reflector member 40.

A filter cover 70 includes a top solid surface 71 and a lip 21 that can simply removable snap fit over the distal edges 87 of angled walls 86.

Figure 2A:
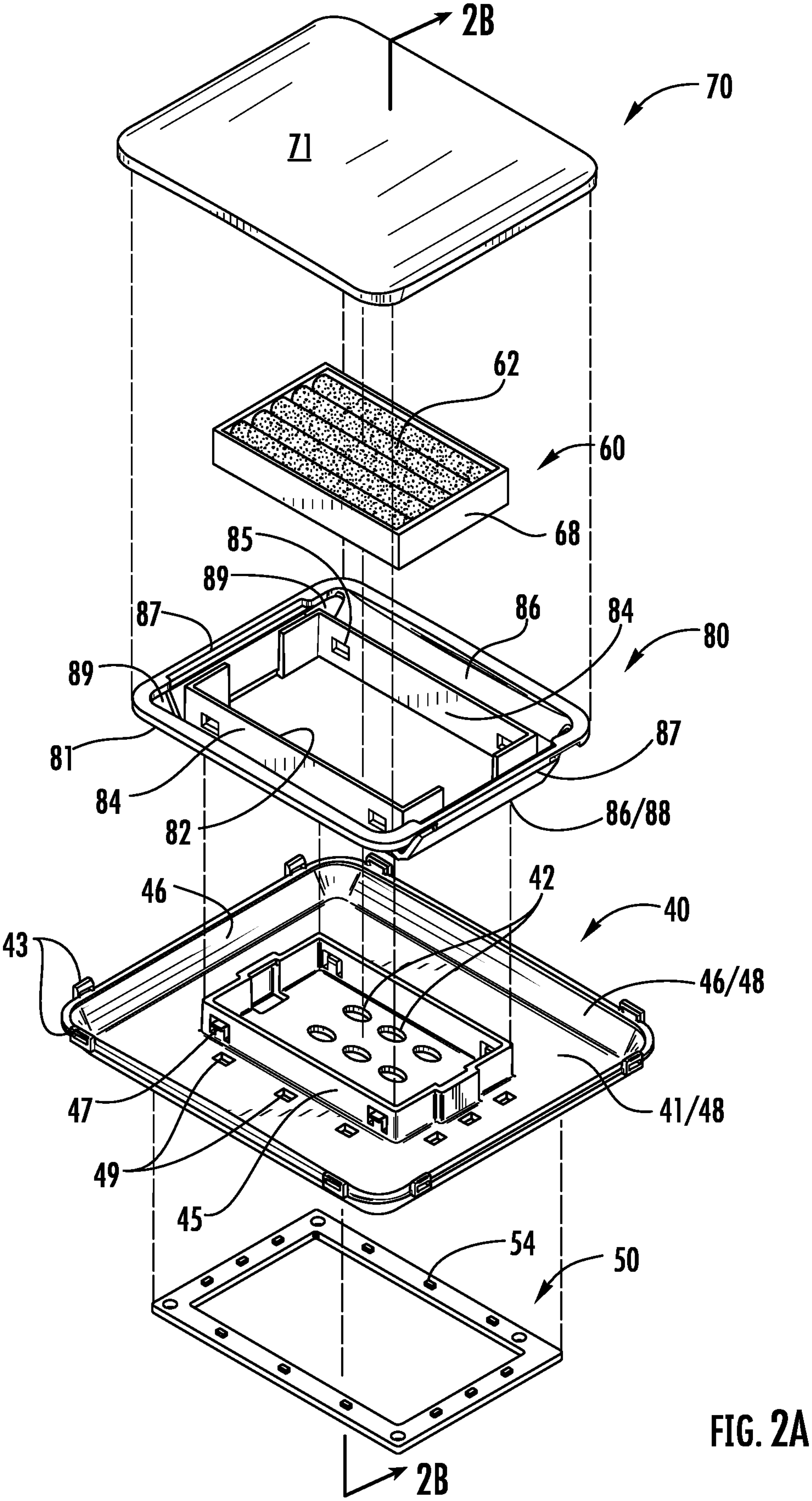
FIG. 2A is an exploded perspective view of a first specific embodiment of an air filter assembly that could be used with the general embodiment of FIGS. 1A-D.
Figure 2B:
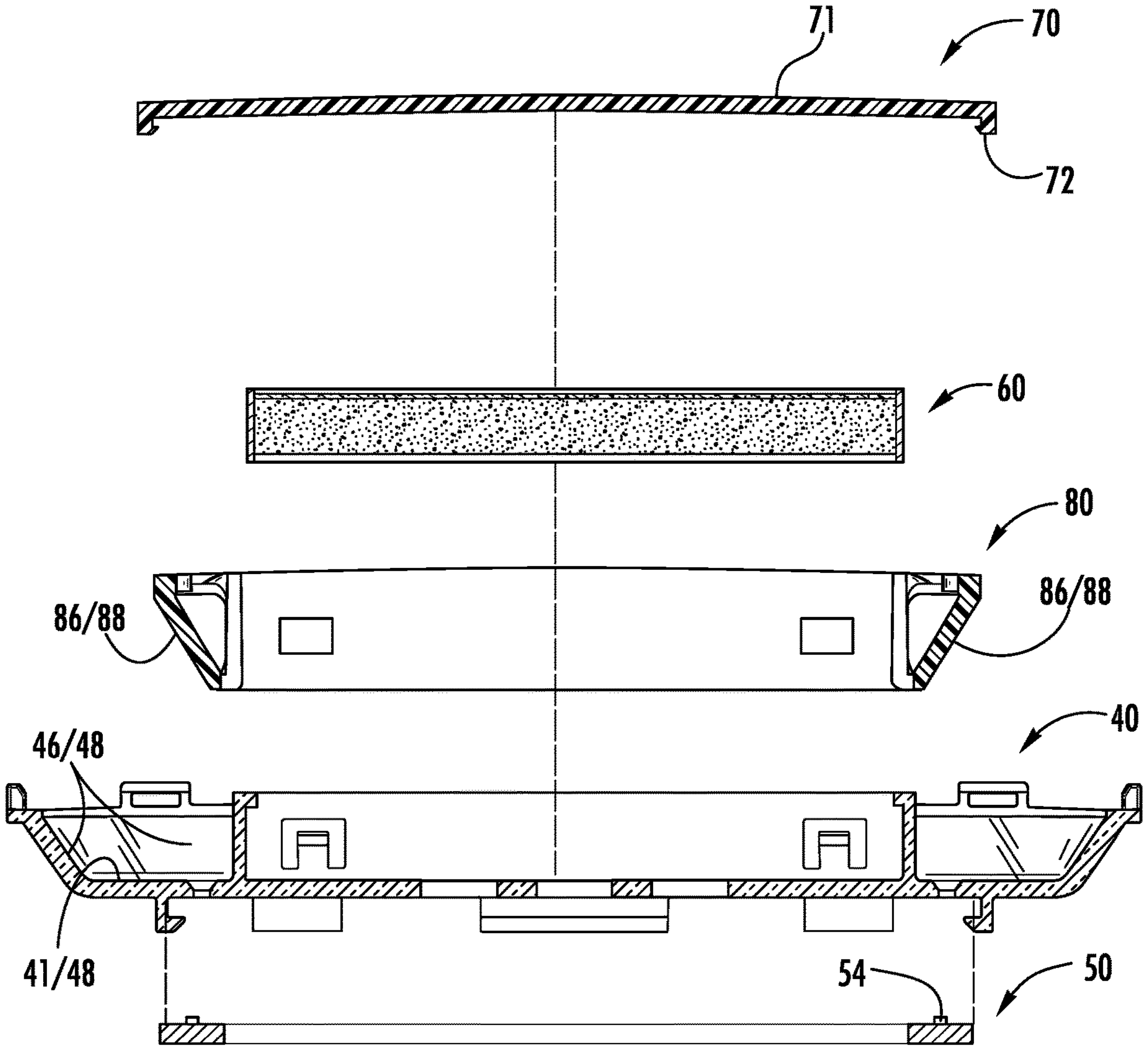
FIG. 2B is a sectional view taken along line 2B-2B of FIG. 2A.
Figure 2C:
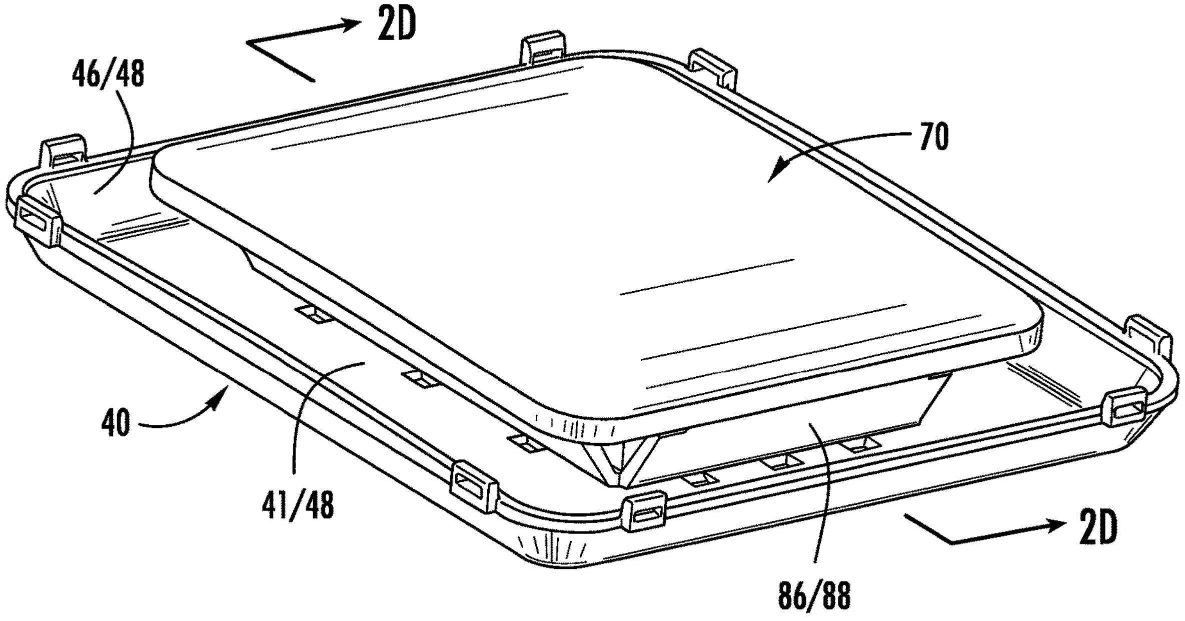
FIG. 2C is a perspective assembled view of FIGS. 2A and 2B.

By comparing FIGS. 2A and B to FIGS. 2C and D, the various parts of assembly 30, as well as how they come together, can be seen. When assembled in air tower 20, filter 60 is covered by removably cover 70 with channel 34 (FIGS. 1A-D) disposed between the perimeter of cover 70 and the perimeter of reflector member 40.

Figure 2D:
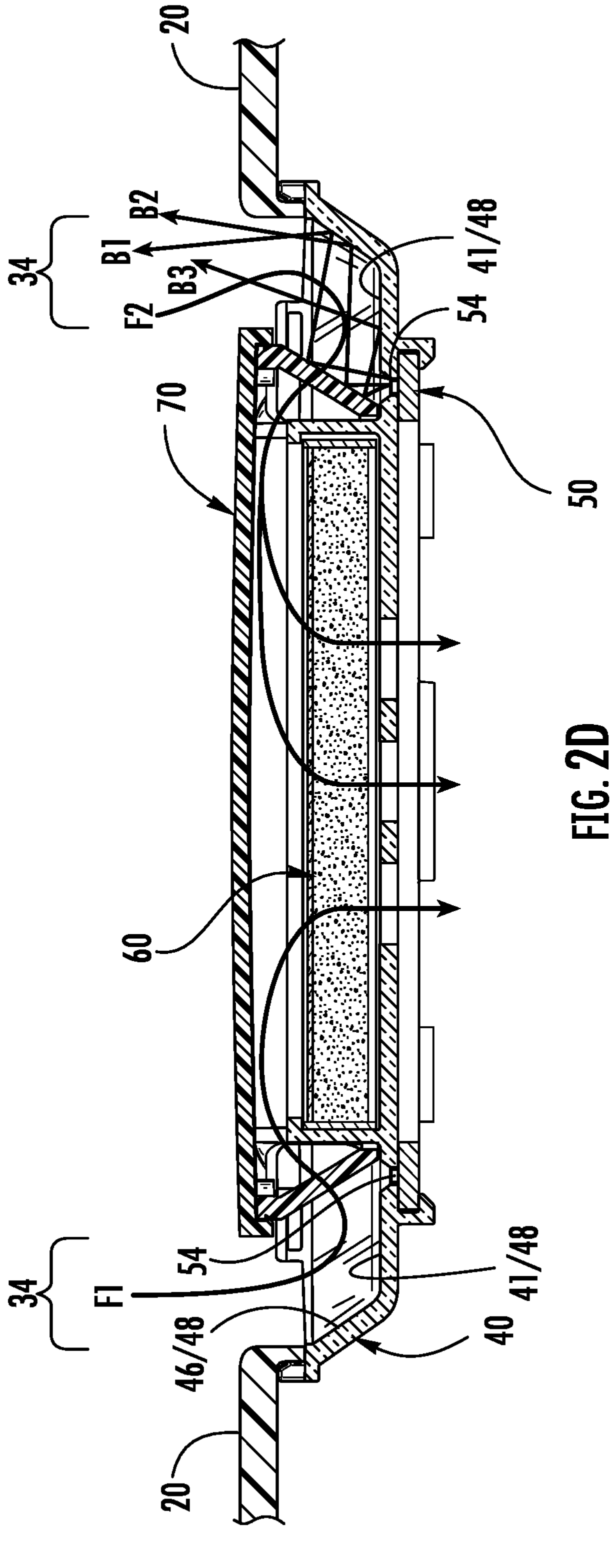
FIG. 2D is a sectional view taken along line 2D-2D of FIG. 2C.

FIG. 2D shows how assembly 30 both provides the accent lighting and an intake flow path through filter 60. Reflective surfaces 48 and 88 cover a substantial portion of obliquely angled walls 46 forming the intermediate portion of base 40, which extend inwardly moving away from liner 22 (i.e. toward the exterior of refrigerator 10) and angled walls 86 of inner member 80. Additionally, the flat surfaces 41 on the inner and outer portions of reflector member 40 can also be reflective. This can be by the material of members 40 and 80. Alternatively it can be by a reflective coating, layer, or separate add-on reflector. LEDs 54 extend through apertures 49 in member 40. As generally illustrated by arrows B1 and B2 in FIG. 2D, light from LEDs 54 would project onto inner angled reflective walls 86, direct across channel 34, reflect off of angled walls 46 (and some off of flat surfaces 41) of member 40 and out channel 34. This multiple reflection and a diverging light output pattern from the LEDs disperse the LED light in a manner to produce the glowing or luminance in and from channel 34.

In this example, the LEDs can be a commercially available Everlight Electronics Model 19-117Z/BHC-YL2M2QY/3T (0603 Package Chip Led (0.4 mm Height) blue LED. Others are of course possible.

This embodiment therefore allows easy access to removable filter 60 by simply unsnapping cover 70, grabbing filter 60, and pulling it out. While assembled, assembly 30 decoratively covers filter 60, provides accent lighting around it, and also presents an air intake to it. FIG. 2D shows the air intake path with arrows F1 and F2. Air can enter channel 34, flow into openings 89 in all four corners of member 80, flow into the front side 62 of filter 60, flow through the body of filter 60 and exit the several openings 42 in member 40.

FIGS. 3A-D, as well as FIGS. 4A-B, give more details regarding one specific combination of components to achieve the appearance and functionality of the air filter assembly 30 of FIGS. 1A-D. Rectangular opening 32 in air tower 20 is pre-formed. In this example, there is an inwardly bent flange or lip 21 around opening 32.

What will be called the base 40 of air filter assembly 30 is a clear plastic part having the following characteristics. A plate 41 has a central through-opening 42. Opening 42 has a shape which would receive one side of air filter 60 by interference fit. The perimeter of base 40 is essentially a U-shaped member 43 defining a slot 44. Slot 44 has characteristics to allow it to be interference fit into turned-in lip or flange 21 of the outer wall of air tower 20. Between slot 44 and opening 42 of base 40 is an angled web 46 (e.g. solid clear plastic sections). When assembled (see FIG. 3D) to lip 21, base 40 is recessed behind the outer surface of air tower 20.

Printed circuit board (PCB) 50 is essentially a rectangular frame or plate 51 defining an interior through-opening 52. LEDs 54 are distributed roughly equally spaced on front side 53 (see FIG. 4A). Opening 52 is complimentary to the exterior of plate 41 of base 40 such that it can be interference fit around plate 41 of base 40 (see FIG. 3D). In that position, LEDs 54 are directly under angled web 46 of clear base 40 (see FIG. 3E).

As shown in FIGS. 4A and 4B, PCB 50 also includes other components of an electrical circuit to operate LEDs 54. Resisters 56 are surface-mounted on front side 53 of PCB 50. As shown in FIG. 4B, in this embodiment four strings of three LEDs each are connected in parallel to wires 58. Wires 58 can be routed through air tower 20 to electrical power and other circuitry.

Figure 3A:
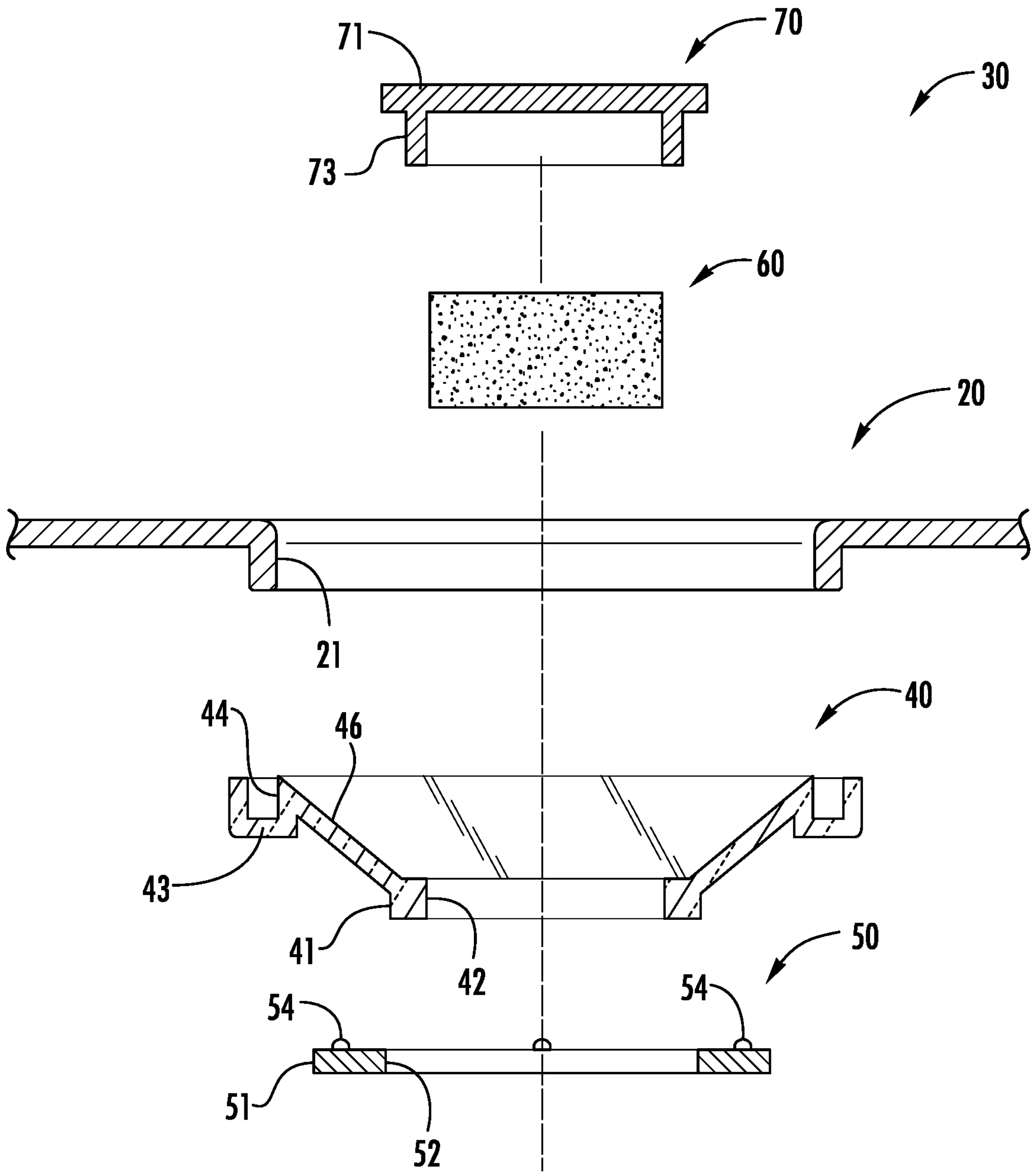
FIG. 3A is an exploded sectional view of another possible embodiment of an air filter assembly that could produce the same or similar characteristics of the general embodiment of FIGS. 1A-D, taken along line 3A-3A of FIG. 3B.
Figure 3B:
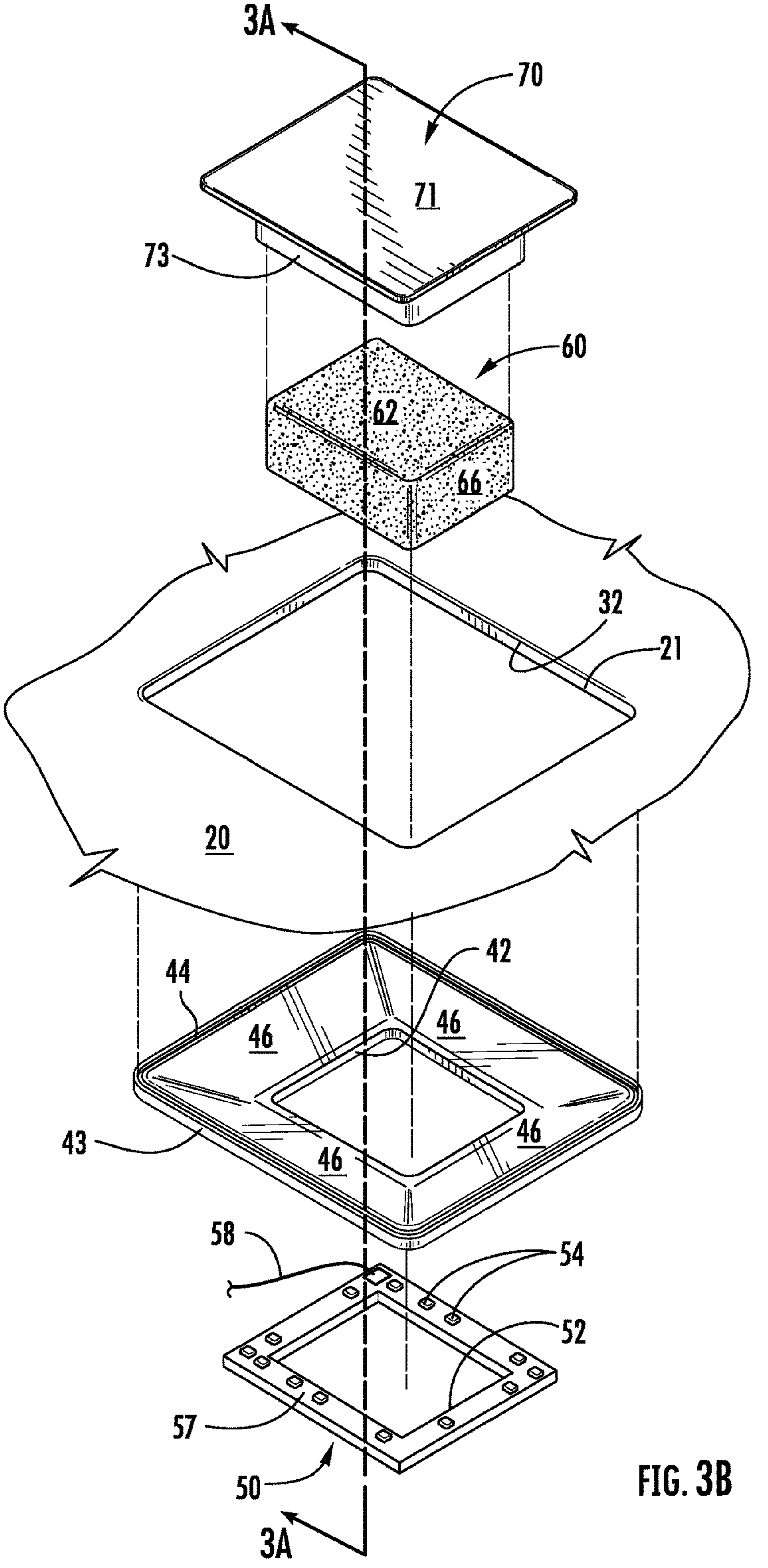
FIG. 3B is an exploded view of the components of FIG. 3A in perspective.
Figure 3C:
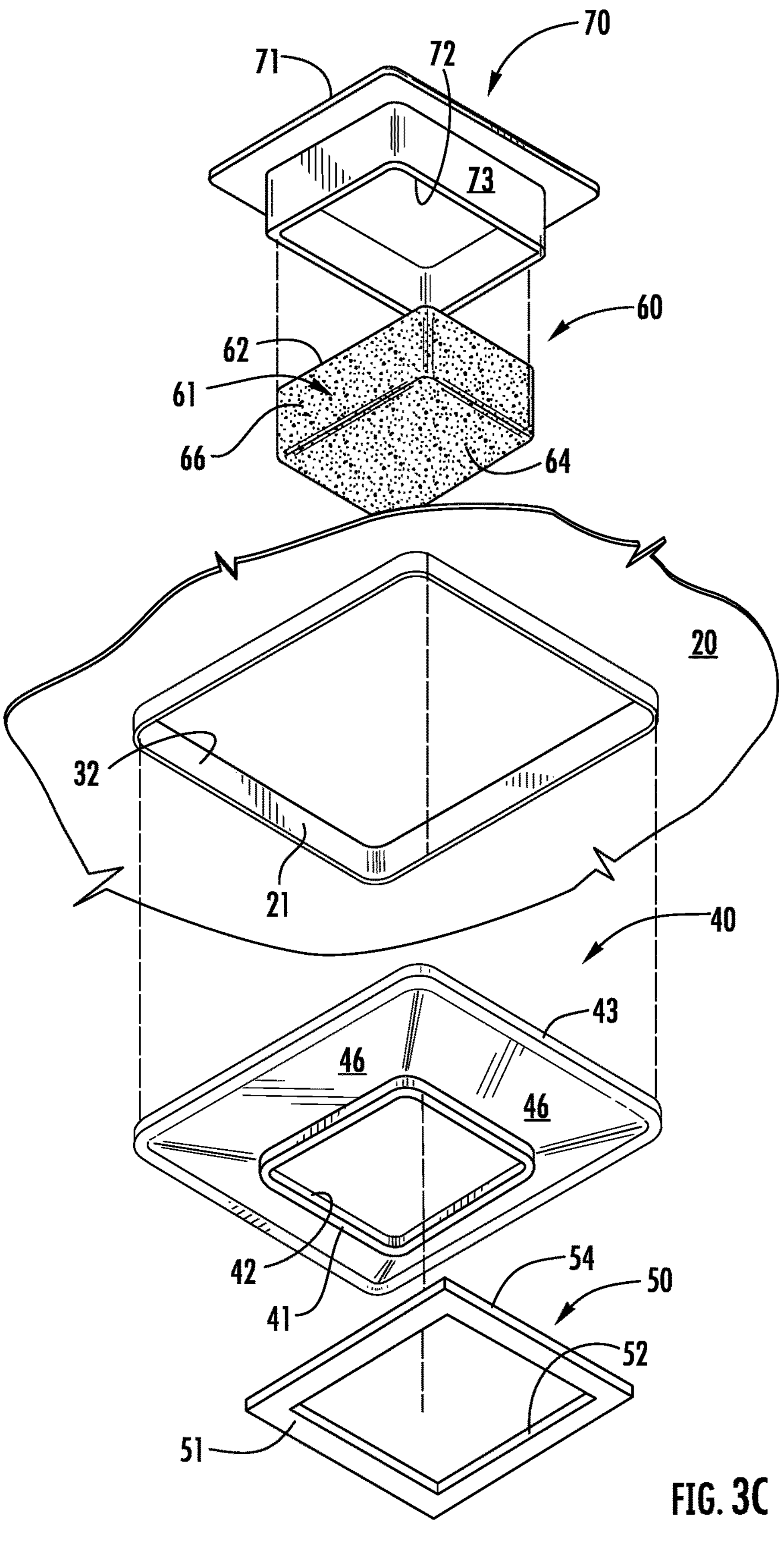
FIG. 3C is a perspective view similar to FIG. 3B but from a different perspective.
Figure 3D:
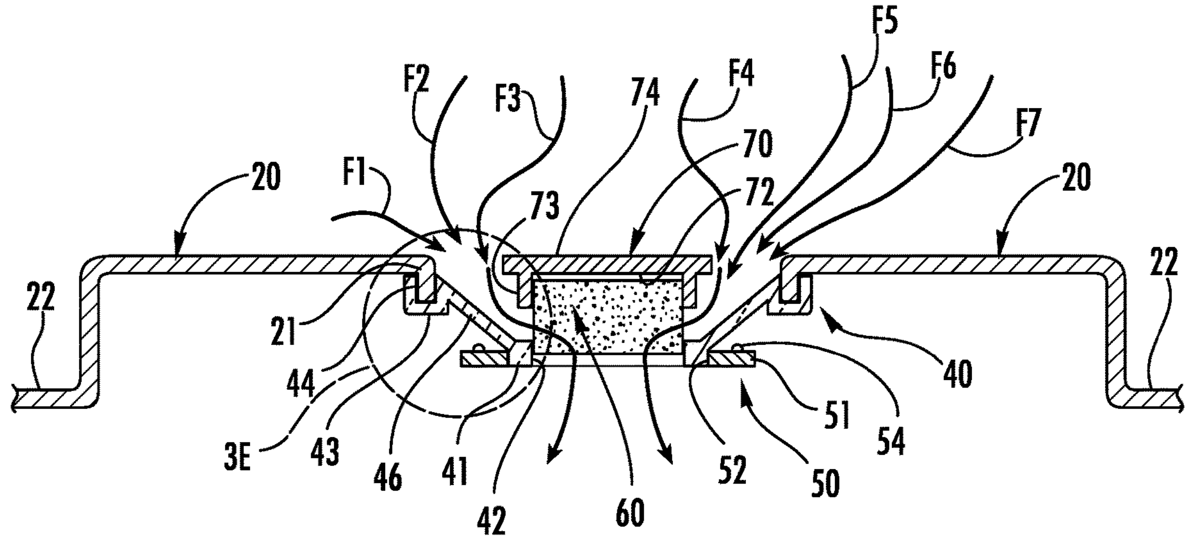
FIG. 3D is a sectional view of the components of FIG. 3A but assembled.
Figure 3E:
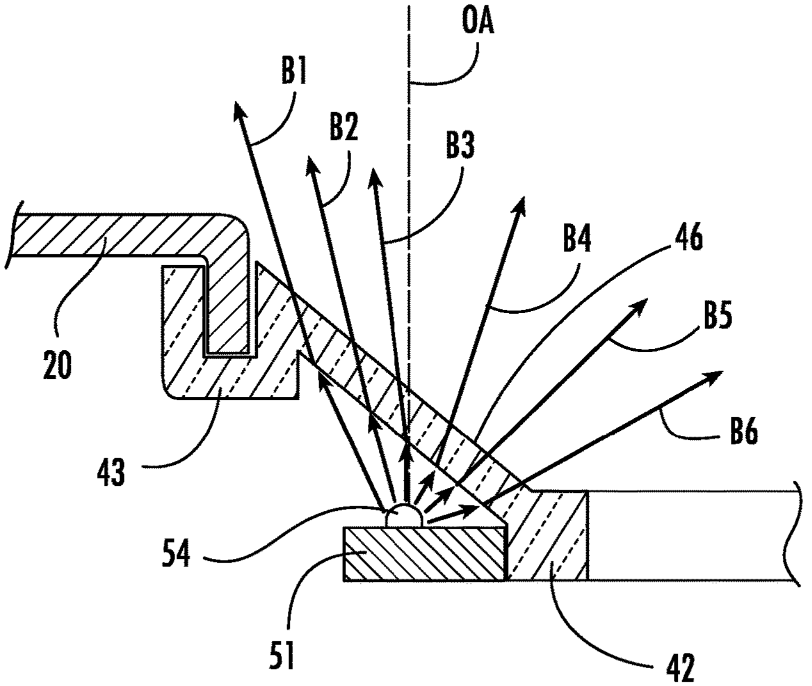
FIG. 3E is an enlargement of circled area 3E of FIG. 3D.

In this embodiment filter 60 is basically a valid rectangular-in-cross-section filter medium having a body 61 with front 62, back 64, and side wall 66. As illustrated in FIG. 3D, its perimeter is complimentary to center opening 42 and base 40 to allow it to be interference fit therein. However, it has a thickness that extends forwardly outside of opening 42 to allow intake air to move into channel 34, be guided by angled web 46 into filter side wall 66, and exit filter back side 64 into the air tower 20.

Cover 70 is an independent piece including a forward portion defining surface 71 and a receiver 72 defined by side wall 73 behind surface 71. The shape of receiver 72 is also complimentary to the perimeter length and width of filter 60 body 61. Receiver 72 of cover 70 can simply be interference fit over the opposite side of filter 60 from that seated in base 40. As shown in FIG. 3D, the thickness of filter body 61 (the thickness of side walls 64) is such that when interference fit in opening 42 of base 40 and in receiver 72 of cover 70 a substantial part of side wall 66 of filter 60 are exposed. As shown by flow arrows F1-F7 in FIG. 3C, when assembled a flow path for air from fresh food compartment 12 and through filter 60 and base opening 42 into the interior of air tower 20 is maintained. At the same time side 62 of air filter 60 facing the fresh food compartment 12 is decoratively covered by cover 70 which appears to be “floating” in space. Still further LEDs 54, when turned on, emit a radiation pattern that creates the luminosity or glowing from the space between the perimeter of cover 70 and opening 32 in air tower 20.

Further details regarding particular components are as follows. PCB 50 can be made of conventional printed circuit board with surface mounted components and conventional wiring according to circuit diagram of FIG. 4B. In this embodiment, LEDs 54 can be surface mount (package SM0603) blue LED dies with a light dispersive optical covering. For example, commercially available KingBright APT1608QBC/G or D blue 180 millicandela (MCD) package case 0603 LEDs could be utilized. As such, LEDs 54 effectively backlight angled web 46 as LEDs 54 are behind web 46 like conventional backlighting. The beam angles, intensities, and other characteristics of LEDs 54, and the characteristics of web 46 (e.g. optically clear, clear, or translucent), cause a viewer from the perspective of FIGS. 1A-C to see a glow or luminosity around air filter cover 70. The nature of base 40 and principles of reflection and refraction can, by diffusion, essentially create a substantially uniform luminosity or glow of the channel framing filter cover 70. In other words, there can be reduced or no bright or hot spots at the location of each LED 54. Rather, base 40 would glow relatively uniformly.

The LEDs can be selected to have characteristics to be effective for that purpose and in the environment of a refrigerator/freezer. One selected characteristic may be tolerance of a temperature range for a reasonably useful LED life over typical refrigerator appliance temperature ranges (e.g. −20° C. to 80° C.). Beam angle could be half intensity plus or minus 60 to 170 degrees and, in one example, about 130 degrees. However, as can be appreciated, different LED types and characteristics can be used along with different optical characteristics of base 40 to achieve similar luminosity results. Again, the combination described produces accent lighting around filter cover 70 but does not produce glare or spill light that obscures cover 70 or any indicia on it. It does not overwhelm or materially adversely affect other lighting in the refrigerator. Of course, the characteristics can be adjusted according to need or desire.

In this embodiment, nominal characteristics of the circuit of FIGS. 4A and B (four strings of three LEDs each) are as follows:

Strip total power=0.4 W
Forward voltage=3.02 V
Bias resistor (R)=462.28 Ohms
Current per string=7.38 mA
The closest 1% resistor available is 464 Ohms
With this resistor the power would be 0.3985 W
Initial power variation=~25% i.e. Pmax=0.5 W
JST XA (2 pin) type connector However the designer can vary these characteristics according to need or desire. An alternative way to describe LEDs 54 is blue small signal LEDs such as are conventional for user interfaces. Again, the power draw and light output production are not needed for task lighting type illumination levels but rather accent lighting.

As shown, PCB 50 can be a rectangular shape having a cutout therein such that the body of PCB 50 defines a frame having a thickness of about 8 mm around the opening. PCB 50 can further have a length, width, and height of about 70 mm, about 90 mm, and 1.6 mm, respectively. Wiring 58 could be operatively electrically connected to two refrigerator circuitries that could have the following function. When that circuitry senses a switch indicating opening of either or both doors 14L or 14R, LEDs 54 would be activated. Conversely when both doors are closed, LEDs 54 can be turned off.

The above characteristics of the circuit of FIG. 4B can be selected to work for available power given other needs for electrical power of refrigerator 10. Selection of the LEDs can be such that they draw a power level which does not add substantially to electrical energy consumption. It can be tied in to a wiring harness that would also go to other illumination functions such as fresh food compartment illumination LEDs 28, providing further economies.

As can be further appreciated, cover 70 can be molded of thermal plastic and relatively inexpensive. It can be aesthetically matched in color and finish to the outer wall of air tower 20 for an integrated appearance. Filter 60 can be made of typical filtering media (with or without a frame or cage) such as what is known in the art. Base 40 can be molded of thermal plastic having clear optical properties or substantially clear optical properties. On the other hand it could be semi-light transmissive or translucent.

Interference fit of components is possible. Alternatively, base 40 could be adhered or fastened to air tower 20, such as to the outer wall thereof, as could PCB 50 to base 40. For a removable and replaceable filter 60, filter 60 could be releasably mountable to base 40 as would cover 70 to filter 60. But other techniques are possible.

With reference to FIGS. 3A-3E, when assembled air filter assembly 30 looks to be integrated with the outer wall of air tower 20 and wall 22 of fresh food compartment 12. The combination produces accent lighting which frames cover 70. At the same time the flush position of cover 70 and channel 34 allow intake air from fresh food compartment 12 to pass around cover 70, through the exposed side-wall portions of filter 60, through a portion of filter 60 into the air tower 20, and then circulated back into fresh food compartment 12 through vents 38 in air tower 20 spaced apart from air filter assembly 30.

LEDs 54 are turned on when the refrigerator control circuit senses a refrigerator door is open (which is conventional by a door open switch in most refrigerators). As described above, the accent lighting which surrounds cover 70 is aesthetically pleasing. It also identifies and allows location of the air filter for replacement. But it does not overwhelm, or create glare or spill light that is disruptive of, other functions or illumination.

Furthermore, cost effectiveness is achieved by the materials and minimization of parts and components. The pieces are predominantly thermoplastic, although they do not have to be. Filter 60 pops into base 40. Cover 70 pops on top of filter 60. The angle of the web 46 at base 40 provides both an at least partially light transmissive angled surface for light from LEDs 54 but also channels intake air through filter 60. Energy consumption is minimal. There is no obstruction of space utilization because of the components being flush or recessed. Furthermore, it is adaptable and flexible to different refrigerator configurations or placements in refrigeration appliances.

Figure 5A:
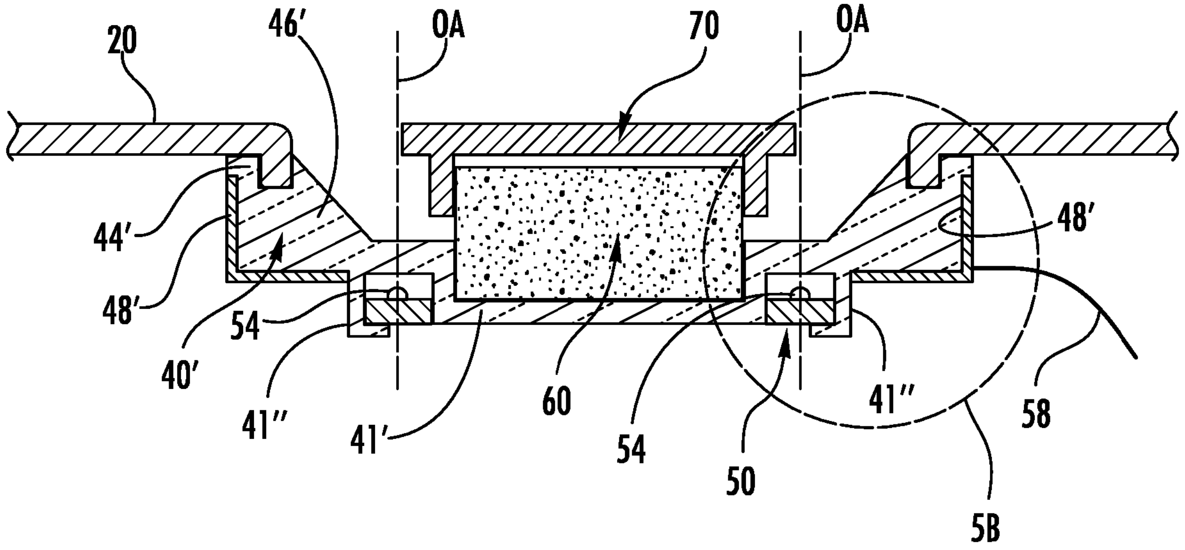
FIG. 5A is an assembled sectional elevation view of an alternative embodiment of an air filter assembly according to the present invention.
Figure 5B:
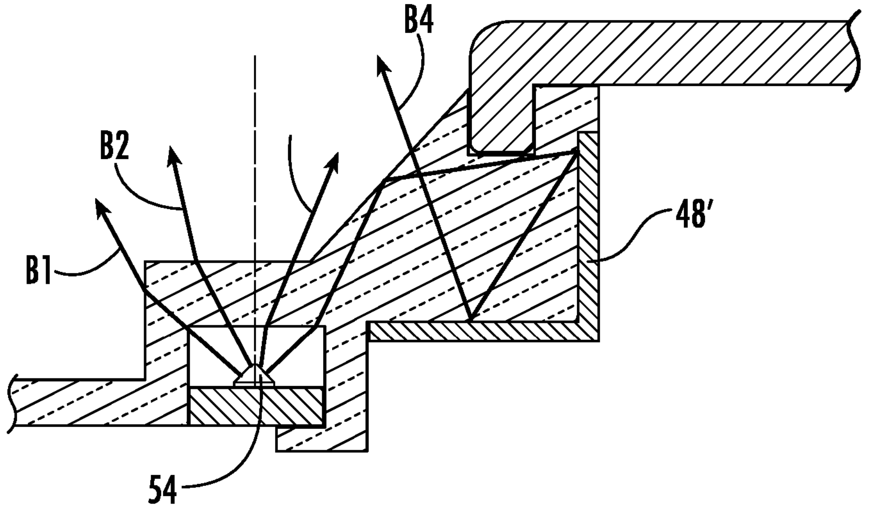
FIG. 5B is an enlargement of circled area 5B of FIG. 5A.

As will be appreciated by those skilled in the art, variations are possible. Variations obvious to those skilled in the art will be included within the invention which is defined solely by its claims. In one example, the configuration of base 40 may vary. FIGS. 5A-B show a different configuration for a base (see reference numeral 40'). It differs from base 40 of the other figures in that it has a triangular-in-cross section perimeter wall. A reflective surface 48' could be added (for example, as a coating) to the bottom of that perimeter portion as indicated in the insert in FIG. 5A. This could promote not only light from LEDs 54 going right through the clear web portion of base 40 but also by total internal reflection (TIR) and reflection off of a reflector 48', directing that reflected light out angled surface 46' and between cover 70 and the adjacent portions of air tower 20. This is another way to create luminosity and accent lighting at an effective level for the purposes of the invention. An alternative snap-in connection for PCB 50 is flanges 41" shown in FIG. 5A.

Figure 6:
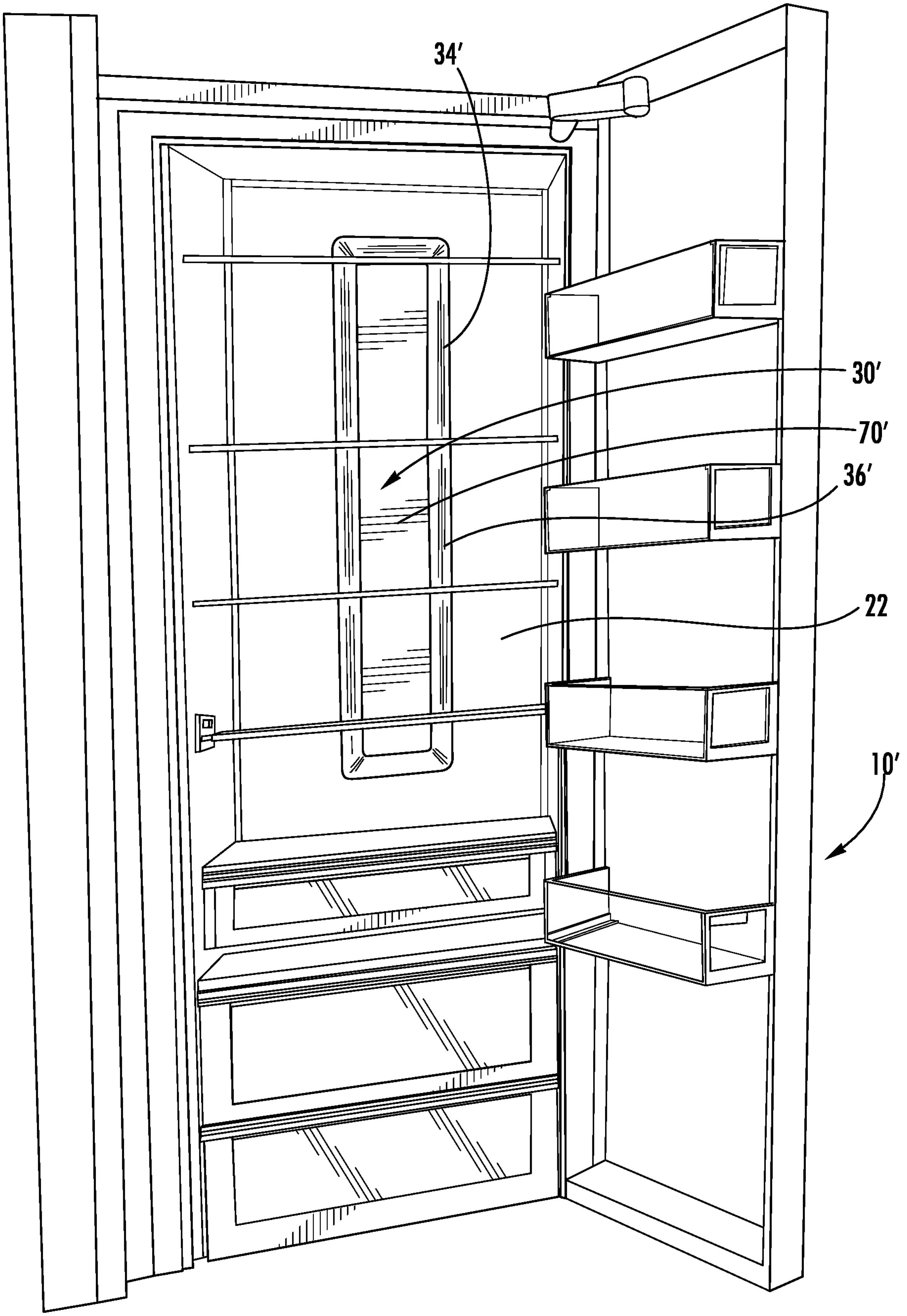
FIG. 6 is a view similar to FIG. 1A showing an alternative embodiment of an air filter assembly according to the present invention.
Figure 7A:
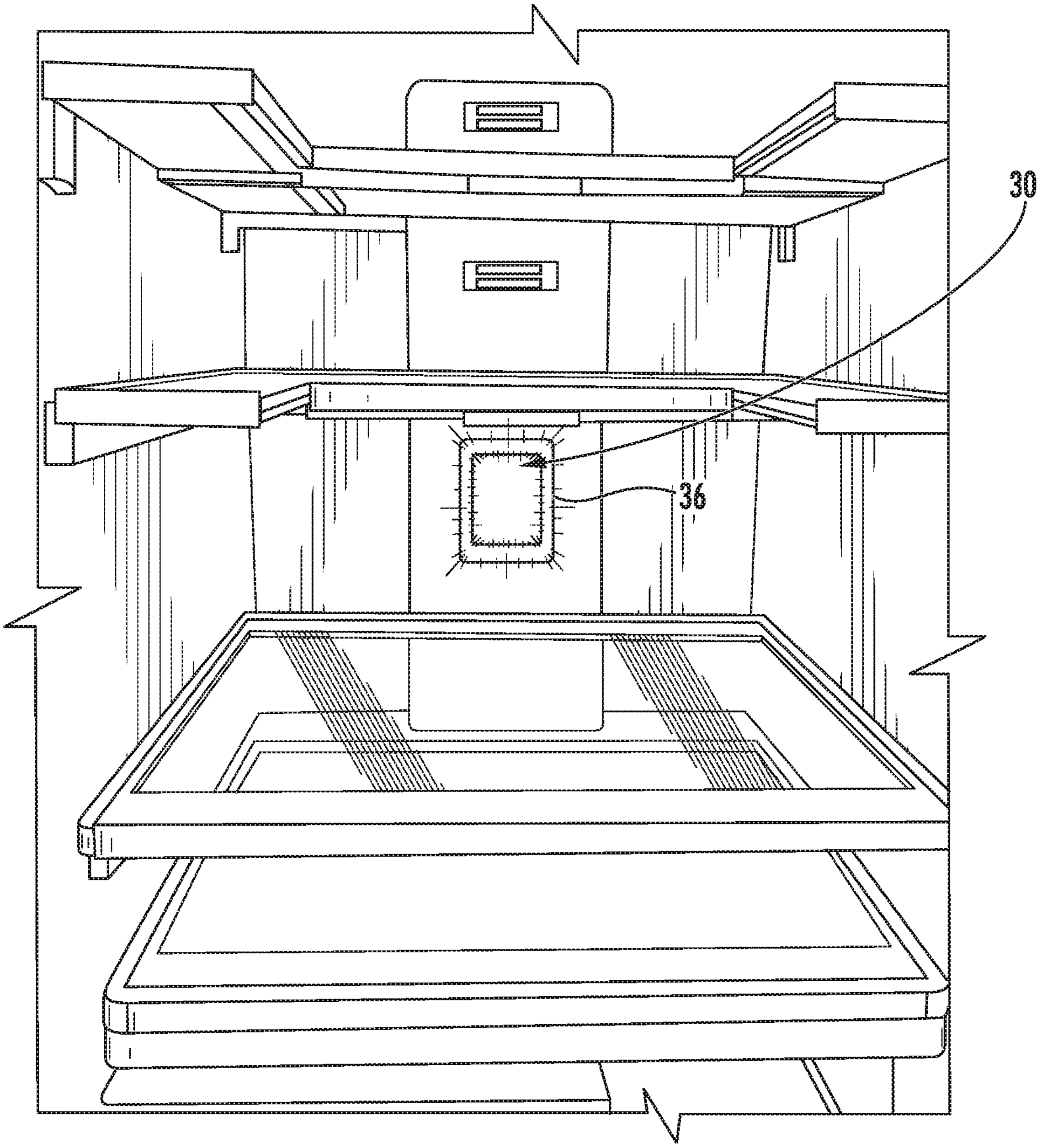
FIGS. 7A-C are views of an embodiment similar to FIGS. 1A-D showing the luminance that frames the filter cover.
Figure 7B:
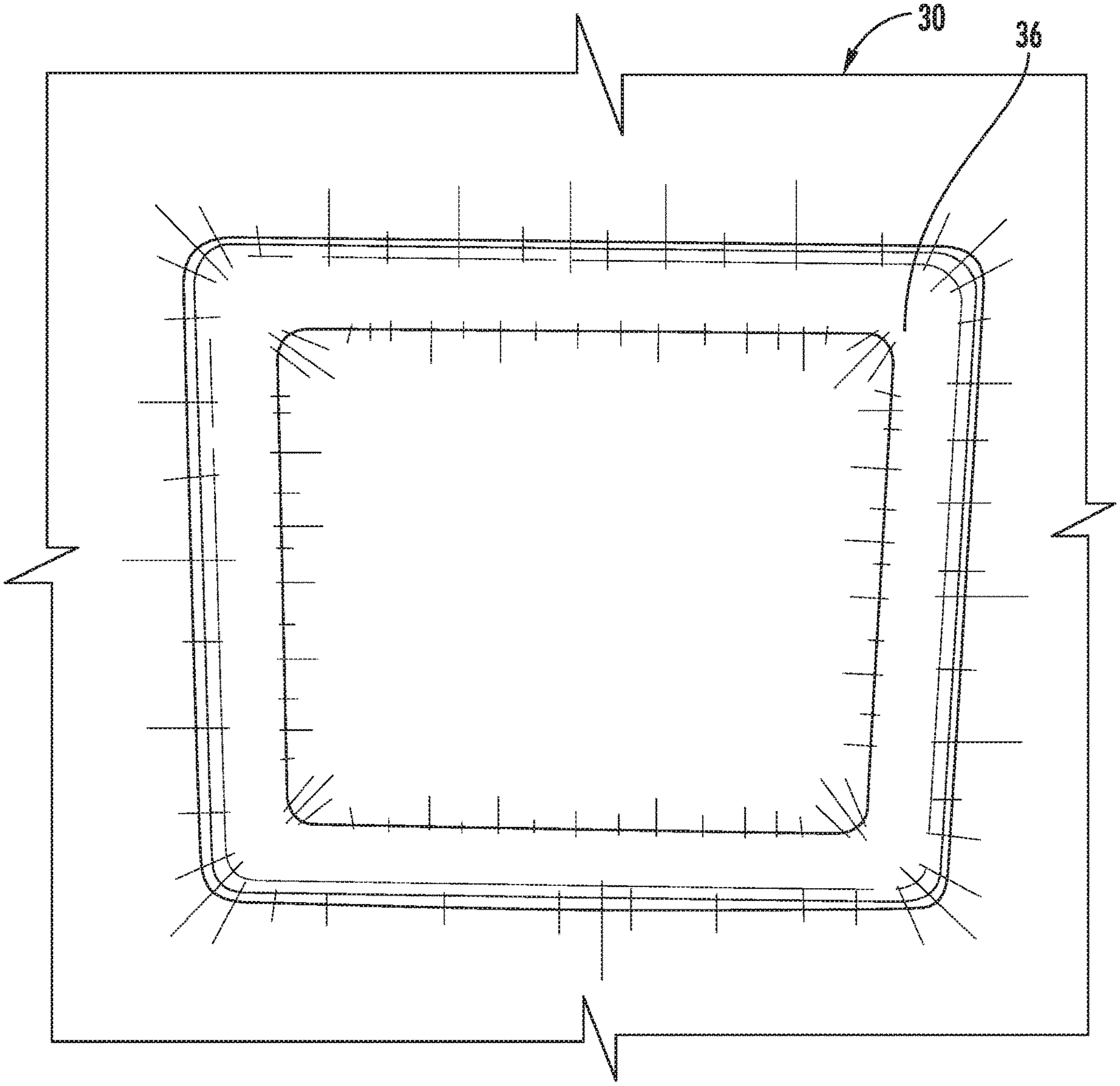
Figure 7C:
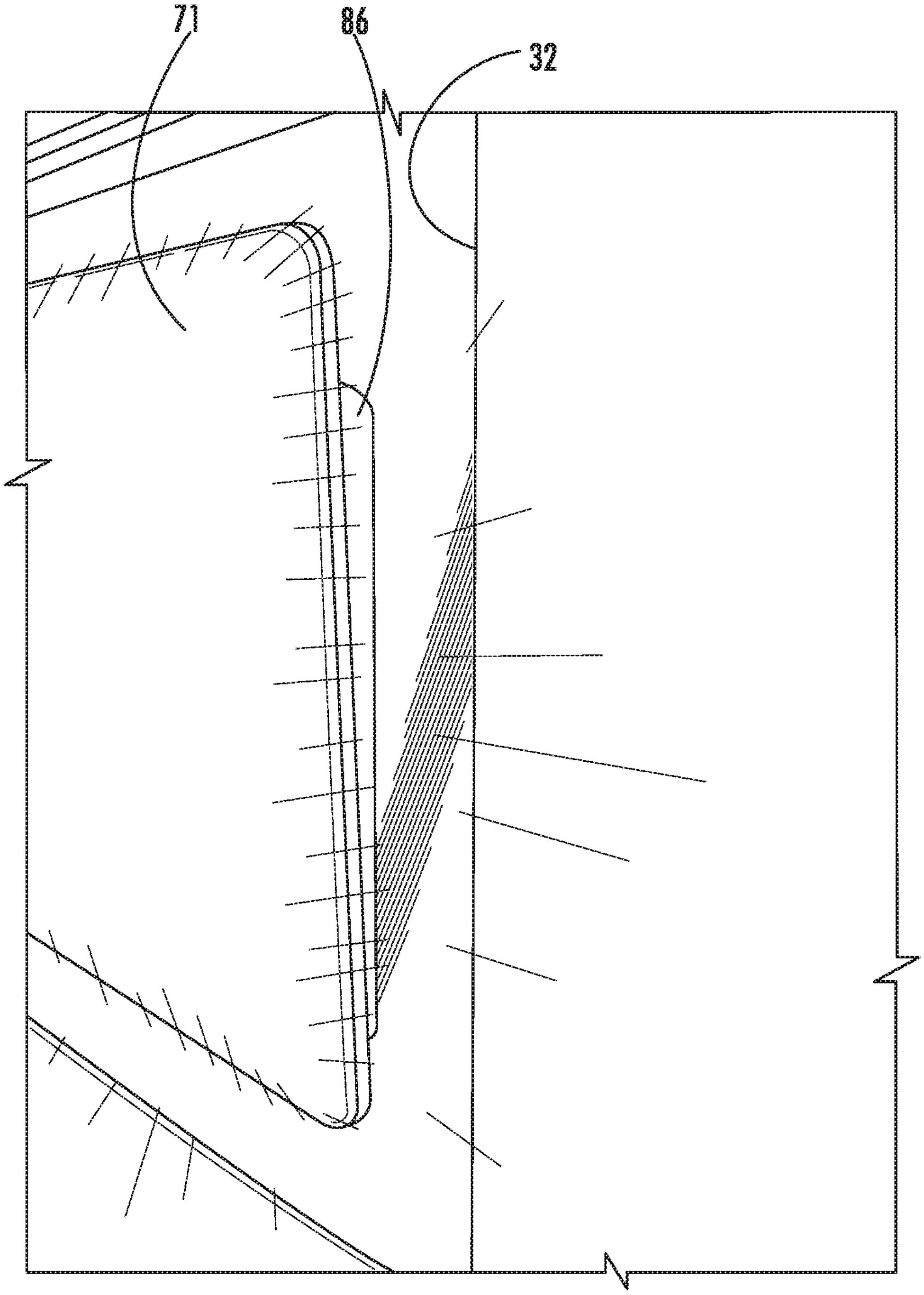
Figure 8:
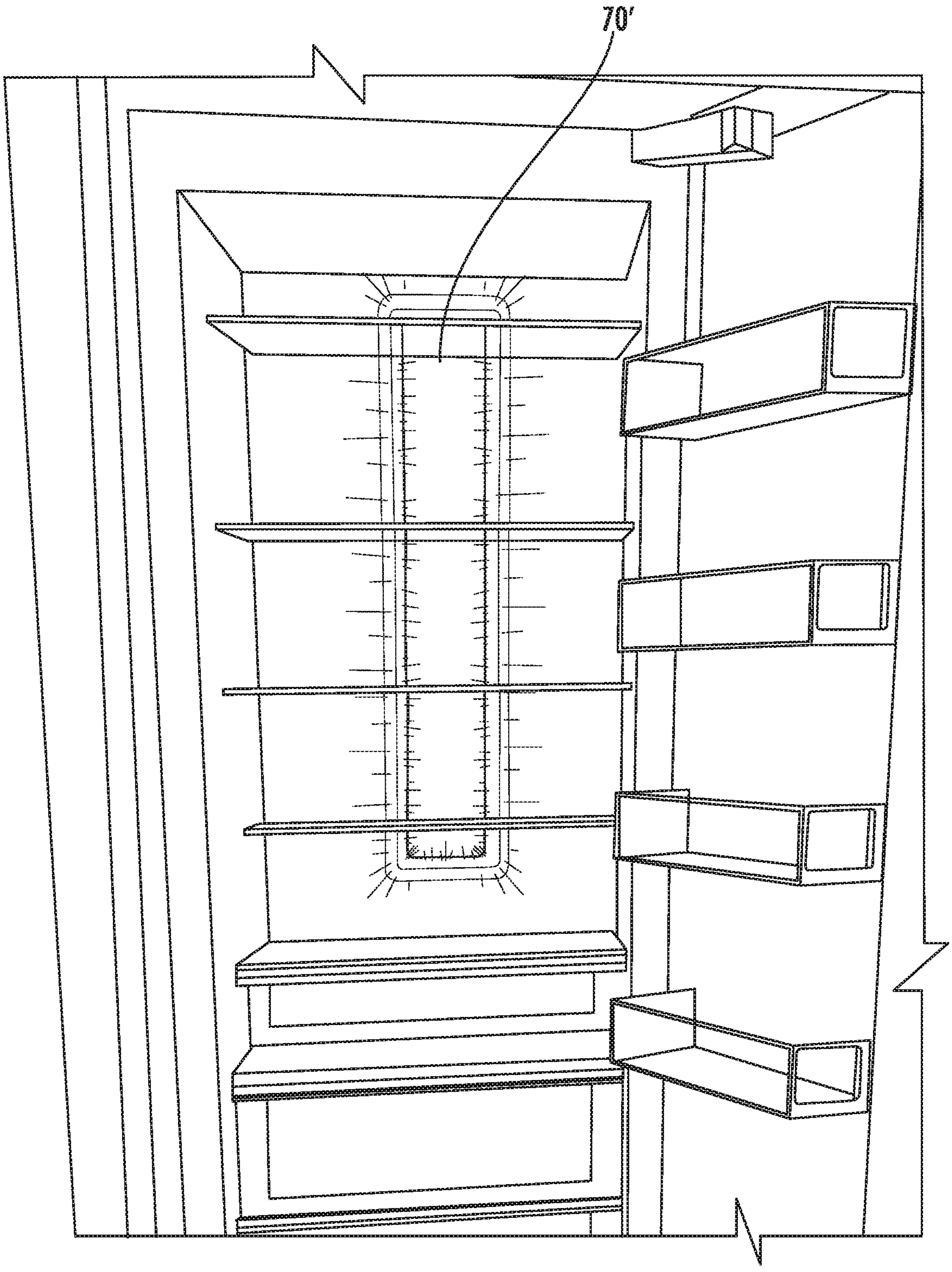
FIG. 8 is a view of an embodiment similar to FIG. 6 showing the luminance that frames the filter cover.

Another example of an alternative is illustrated in FIGS. 6 and 8. The form factor of cover 70 could vary. In this example, cover 70' has a substantial vertical height compared to cover 70 previously described. The width of channel 34' can be roughly the same as Embodiment 1, but it could be different. It is to be understood a larger filter cover could allow a larger single piece filter or multiple filters to be utilized. Or, it simply could be an aesthetic alternative that could provide a different look to the interior of a compartment of the appliance. It is to be further understood that the radiation color from channel 34' could differ from that of the first embodiment or be the same. In this embodiment, it is white light. That could be created by white LEDs or by filters that would convert a different color LED into white light. Alternatively, any of a variety of different colors could be utilized. In a further example, cover 70 can simply be associated with intakes and/or vents of the air tower itself, without being removable or containing a removable filter therein. In specific variations, cover 70 may house a permanent filter or no filter at all, instead giving an aesthetic appearance similar to that which is described herein to an air tower.

One example of an optional feature would be to have several different colored LEDs on PCB 50. Circuitry could monitor length of cumulative time since the last filter change. When a predetermined cumulative time expires, the accent lighting could change from one color to another. An example would be blue accent lighting during useful life of that filter. It could change to red when the circuit wants to alert the owner of the appliance change of filter is recommended, such at or toward the end of the estimated useful life of the filter. Many conventional refrigerators have circuits or sensors that would generate a "change filter" signal that could be used to shut off the blue LEDs and activate the red LEDs of the example given above.

It is to be further understood that the location of air filter assembly 30 could vary. It does not necessarily have to be centered in the rear wall of a compartment. It could be to one side or one corner of the rear wall. It could also be on a side wall. It might also be in a freezer compartment.

Although the width of channel 34 width can be consistent all around the filter cover, variations in width are possible.

Furthermore, as mentioned earlier, the specific number, power, color, output distribution pattern, other characteristics of the light sources can vary. They do not necessarily have to be LEDs. Instead of simply optically clear or substantially light transmissive non-optical plastic (e.g. angled web 46 or 46') as a clear covering over the light sources, components having optical characteristics (lens, reflectors, diffusers, filters, etc.) could be utilized.

Still further, cover 70 does not have to be absolutely flush or coplanar with the outer surface of air tower 20. It could be a bit out of plane or could be substantially recessed and still provide a multi-function of air intake and accent lighting.

Additionally, it is to be understood that the perimeter shape of cover 70 is not limited to one that is rectangular. A wide variety of sizes and geometric shapes (e.g., symmetrical or asymmetrical, regular or irregular) are possible. The perimeter of cover 70 could be curved, compound curves, or a combination of straight and curved sections and still retain the multi-functionality of air intake plus accent lighting around such cover. Also, the filter could be any of a variety of shapes (symmetrical or asymmetrical). The filter cover (e.g. 70 or 70') could substantially follow the perimeter of the filter. Alternatively, the perimeter of the filter does not have to be complimentary to the perimeter of the cover.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerator, comprising:

a cabinet body;

an interior liner disposed in the cabinet body and defining at least a portion of an interior space within the refrigerator, the interior liner defining an opening therein, the opening defining an inner perimeter; and an air filter assembly positioned at least partially in the opening of the interior liner, the air filter assembly comprising:

a cover having a major surface facing the interior space and positioned generally flush with a portion of the liner surrounding the opening, the cover defining an outer perimeter spaced apart from the inner perimeter of the opening;

a frame recessed from the major surface and the liner and at least partially enclosing a channel extending between the outer perimeter of the cover and the inner perimeter of the opening;

at least one light source directed into the channel and illuminating a portion of the frame; and an air filter disposed at least partially within the cover positioned behind the major surface.

2. The refrigerator of claim 1, wherein the cover defines a portion of an air flow path around the outer perimeter and directed to an interior of the cover and through the air filter.

3. The refrigerator of claim 2, wherein:

the interior space is a fresh food compartment of the refrigerator and the opening is in a portion of the liner defining a vertical wall; and the vertical wall of the liner covers an air path between the vertical wall and the cabinet body.

4. The refrigerator of claim 1, wherein the at least one light source is coupled with the cover along a portion thereof disposed behind the major surface and facing a portion of the frame.

5. The refrigerator of claim 4, wherein the frame is of an opaque, reflective material.

6. The refrigerator of claim 1, wherein:

the frame is one of a translucent or transparent material; and the at least one light source is positioned behind the frame and is directed into the channel through the frame.

7. The refrigerator of claim 1, wherein the frame comprises:

an outer portion coupled to the liner adjacent the inner periphery of the opening;

an inner portion behind the major surface and the air filter; and an intermediate portion that extends from the inner portion, beyond the outer perimeter of the cover and to the outer portion.

8. The refrigerator of claim 7, wherein:

the inner portion of the luminous frame includes a receiver with at least a portion of the air filter removably positioned on an interior of the receiver; and the cover removably couples with the frame on an exterior of the receiver.

9. The refrigerator of claim 8, wherein the intermediate portion is angled obliquely away from the inner portion such that the inner portion and the intermediate portion are recessed from the liner.

10. The refrigerator of claim 7, wherein the channel defines a width of about one inch and defines a portion of an air path from the interior space to the air filter.

11. A refrigerator air filter assembly, comprising:

a cover having a major surface defining an outer perimeter;

a frame, including:

an outer portion defining an inner perimeter spaced from the outer perimeter of the major surface;

an inner portion extending behind the major surface; and an intermediate portion that extends from the inner portion, beyond the outer perimeter of the major surface and to the outer portion, the intermediate portion being recessed from the major surface and at least partially enclosing a channel extending between the outer perimeter of the major surface and the inner perimeter of the outer portion;

at least one light source directed into the channel and illuminating a portion of the frame; and an air filter disposed between the cover and the inner portion of the frame.

12. The air filter assembly of claim 11, wherein the air filter assembly is positionable in an interior liner of a refrigerator, the interior liner defining an opening therein, with the outer portion of the air filter assembly coupled to the interior liner within the opening.

13. The air filter assembly of claim 12, wherein, when the outer portion of the air filter assembly is coupled to the interior liner within the opening, the major surface of the cover faces the interior space and is generally flush with a portion of the liner surrounding the opening, the outer periphery of the cover being spaced apart from an inner perimeter of the opening.

14. The air filter assembly of claim 11, wherein the assembly defines a portion of an air flow path through the channel, directed to a cavity defined between the cover and the inner portion of the frame, and through the air filter.

15. The air filter assembly of claim 11, wherein the at least one light source is coupled with the cover along a portion thereof disposed behind the major surface and facing a portion of the frame.

16. The air filter assembly of claim 15, wherein the frame is of an opaque, reflective material.

17. The air filter assembly of claim 11, wherein:

the frame is one of a translucent or transparent material; and the at least one light source is positioned behind the frame and is directed into the channel through the frame.

18. The air filter assembly of claim 1, wherein:

the inner portion of the frame includes a receiver with at least a portion of the air filter removably positioned on an interior of the receiver; and the cover removably couples with the frame on an exterior of the receiver.

19. The air filter assembly of claim 18, wherein the intermediate portion is angled obliquely away from the inner portion such that the inner portion and the intermediate portion are recessed from the liner.

20. A refrigerator, comprising:

a liner having an opening defining an inner perimeter therein;

a frame coupled with the liner around the inner perimeter and recessed from the opening;

a cover coupled with the frame and having a major surface positioned generally flush with a portion the of liner surrounding the opening, the cover defining an outer perimeter spaced apart from the inner perimeter of the opening with a portion of the frame at least partially enclosing a channel extending between the outer perimeter of the cover and the inner perimeter of the opening;

at least one light source directed into the channel and illuminating a portion of the frame; and an air filter disposed at least partially within the cover positioned behind the major surface.

* * * * *